United States Patent
Liu et al.

(10) Patent No.: US 10,965,503 B2
(45) Date of Patent: Mar. 30, 2021

(54) FACILITATING SCRAMBLING OF WAKE-UP SIGNAL SEQUENCES

(71) Applicant: QUALCOMM Incorporated, San Diego, CA (US)

(72) Inventors: Le Liu, Fremont, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 16/370,687

(22) Filed: Mar. 29, 2019

(65) Prior Publication Data

US 2019/0312758 A1 Oct. 10, 2019

Related U.S. Application Data

(60) Provisional application No. 62/654,208, filed on Apr. 6, 2018, provisional application No. 62/673,798, filed (Continued)

(51) Int. Cl.
*G08C 17/00* (2006.01)
*H04L 25/03* (2006.01)
(Continued)

(52) U.S. Cl.
CPC ...... *H04L 25/03866* (2013.01); *H04L 5/0048* (2013.01); *H04L 27/2613* (2013.01); *H04W 52/0229* (2013.01)

(58) Field of Classification Search
CPC ......... H04W 52/0229; H04L 25/03866; H04L 5/0048; H04L 27/2613
(Continued)

(56) References Cited

U.S. PATENT DOCUMENTS

| 2014/0302855 A1 | 10/2014 | Nory et al. |
| 2015/0071153 A1* | 3/2015 | Hong .............. H04L 5/0023 370/311 |

(Continued)

FOREIGN PATENT DOCUMENTS

EP    3047619 A1    7/2016

OTHER PUBLICATIONS

International Search Report and Written Opinion—PCT/US2019/025247—ISA/EPO—dated May 16, 2019.

(Continued)

*Primary Examiner* — Thai D Hoang
(74) *Attorney, Agent, or Firm* — Loza & Loza, LLP

(57) ABSTRACT

Aspects directed towards wake-up signal (WUS) scrambling sequence design are disclosed. In one example, a time-based scrambling sequence that facilitates a phase shift in time may be generated according to a time parameter associated with a WUS or a paging occasion (PO). A scrambled WUS may be generated by multiplying a WUS base sequence by the time-based scrambling sequence, and subsequently transmitted to at least one scheduled entity. In another example, a scrambled WUS may be received from a scheduling entity. A time-based scrambling sequence associated with the WUS may be identified in which the time-based scrambling sequence facilitates a phase shift in time and corresponds to a time parameter associated with a WUS or a PO. The WUS may be descrambled according to the time-based scrambling sequence. Other aspects, embodiments, and features are also included.

51 Claims, 9 Drawing Sheets

Related U.S. Application Data on May 18, 2018, provisional application No. 62/699,630, filed on Jul. 17, 2018.

(51) Int. Cl.
*H04W 52/02* (2009.01)
*H04L 27/26* (2006.01)
*H04L 5/00* (2006.01)

(58) Field of Classification Search
USPC .................................. 370/311; 340/7.32–7.37
See application file for complete search history.

(56) References Cited

U.S. PATENT DOCUMENTS

| | | | | |
|---|---|---|---|---|
| 2018/0018185 A1* | 1/2018 | Sun | ................ | H04W 52/0235 |
| 2019/0297577 A1* | 9/2019 | Lin | ................ | H04W 52/0219 |
| 2020/0092814 A1* | 3/2020 | Zhou | ................ | H04W 80/02 |
| 2020/0112919 A1* | 4/2020 | Nam | ................ | H04W 68/025 |
| 2020/0221384 A1* | 7/2020 | Ang | ................ | H04W 76/28 |
| 2020/0314747 A1* | 10/2020 | Zhou | ................ | H04W 52/0229 |
| 2020/0314816 A1* | 10/2020 | Yi | ................ | H04W 28/20 |
| 2020/0359322 A1* | 11/2020 | Hwang | ................ | H04W 76/11 |

OTHER PUBLICATIONS

Wi Rapporteur (Ericsson): "RAN1 agreements for Rel-15 Further NB-IoT enhancements", 3GPP Draft; 3GPP TSG-RAN WG1 Meeting #92, R1-1803175 RAN1 agreements for Rel-15 NB-IoT after RAN1 92, 3rd Generation Partnership Project (3GPP), Mobile Competence Centre, 650, Route Des Lucioles, F-06921 Sophia-Antipolis Cedex, vol. RAN WG1, No. Athens, Greece, Feb. 26, 2018-Mar. 2, 2018, Mar. 9, 2018 (Mar. 9, 2018), XP051412736, pp. 1-8, Retrieved from the Internet: URL:http://www.3gpp.org/ftp/tsg%5Fran/WG1%5FRL1/TSGR1%5F92/Docs/ [retrieved on Mar. 9, 2018].

* cited by examiner

FACILITATING SCRAMBLING OF WAKE-UP SIGNAL SEQUENCES

PRIORITY CLAIM

This application claims priority to and the benefit of provisional patent application No. 62/654,208 filed in the United States Patent and Trademark Office on Apr. 6, 2018, provisional patent application No. 62/673,798 filed in the United States Patent and Trademark Office on May 18, 2018, and provisional patent application No. 62/699,630 filed in the United States Patent and Trademark Office on Jul. 17, 2018, the entire content of each of which is incorporated herein by reference as if fully set forth below in its entirety and for all applicable purposes.

TECHNICAL FIELD

The technology discussed below relates generally to wireless communication systems, and more particularly, to a system and method that facilitates scrambling a wake-up signal (WUS) sequence. Embodiments can provide and enable techniques for reducing or avoiding false detections of WUS sequences.

INTRODUCTION

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power).

As the demand for mobile broadband access continues to increase, research and development continue to advance wireless communication technologies not only to meet the growing demand for mobile broadband access, but to advance and enhance the user experience with mobile communications. Advances in wake-up signal (WUS) designs, for example, have resulted in improved efficiencies for a user equipment (UE). Indeed, because of such advances, a UE may remain asleep for longer periods of time, which significantly improves battery life. Also, because base stations now have wider range, a network can more efficiently provide a WUS to a greater number of UEs.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various examples and implementations of the present disclosure facilitate optimization of wake-up signal (WUS) sequence scrambling in wireless communication systems. According to at least one aspect of the disclosure, wireless communication devices are disclosed. In at least one example, wireless communication devices may include a transceiver, a memory, and a processor coupled to the transceiver and the memory. The processor may be adapted to generate a time-based scrambling sequence according to a time parameter associated with one of a wake-up signal (WUS) or a paging occasion (PO), where the time-based scrambling sequence facilitates a phase shift in time. The processor may further be adapted to generate a scrambled WUS by multiplying a WUS base sequence by the time-based scrambling sequence, and to transmit the scrambled WUS to at least one scheduled entity via the transceiver.

Additional aspects of the present disclosure include methods operational on a wireless communication device and/or means for performing such methods. According to at least one example, such methods may include generating a time-based scrambling sequence, the time-based scrambling sequence facilitating a phase shift in time and generated according to a time parameter associated with a WUS or a PO. A scrambled WUS may be generated by multiplying a WUS base sequence by the time-based scrambling sequence, and the scrambled WUS may be transmitted to at least one scheduled entity.

Still further aspects of the present disclosure include processor-readable storage mediums storing processor-executable programming. In at least one example, the processor-executable programming may be adapted to cause a processor to generate a time-based scrambling sequence, the time-based scrambling sequence facilitating a phase shift in time and generated according to a time parameter associated with a WUS or a PO. The processor-executable programming may be further adapted to cause a processor to generate a scrambled WUS by multiplying a WUS base sequence by the time-based scrambling sequence, and to transmit the scrambled WUS to at least one scheduled entity.

According to at least one aspect of the disclosure, wireless communication devices are disclosed. In at least one example, wireless communication devices may include a transceiver, a memory, and a processor coupled to the transceiver and the memory. The processor may be adapted to receive a scrambled WUS from a scheduling entity, and identify a time-based scrambling sequence associated with the WUS, the time-based scrambling sequence facilitating a phase shift in time and corresponding to a time parameter associated with a WUS or a PO. The processor may further be adapted to descramble the WUS according to the time-based scrambling sequence.

Additional aspects of the present disclosure include methods operational on a wireless communication device and/or means for performing such methods. According to at least one example, such methods may include receiving a scrambled WUS from a scheduling entity, and identifying a time-based scrambling sequence associated with the WUS, where the time-based scrambling sequence facilitates a phase shift in time and corresponds to a time parameter associated with a WUS or a paging occasion PO. The WUS may be descrambled according to the time-based scrambling sequence.

Still further aspects of the present disclosure include processor-readable storage mediums storing processor-executable programming. In at least one example, the processor-executable programming may be adapted to cause a processor to receive a scrambled WUS from a scheduling entity, and identify a time-based scrambling sequence associated with the WUS, the time-based scrambling sequence facilitating a phase shift in time and corresponding to a time parameter associated with a WUS or a PO. The processor-executable programming may be further adapted to cause a processor to descramble the WUS according to the time-based scrambling sequence.

Other aspects, features, and embodiments of the present invention will become apparent to those of ordinary skill in the art, upon reviewing the following description of specific, exemplary embodiments of the present invention in conjunction with the accompanying figures.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Figure 1:
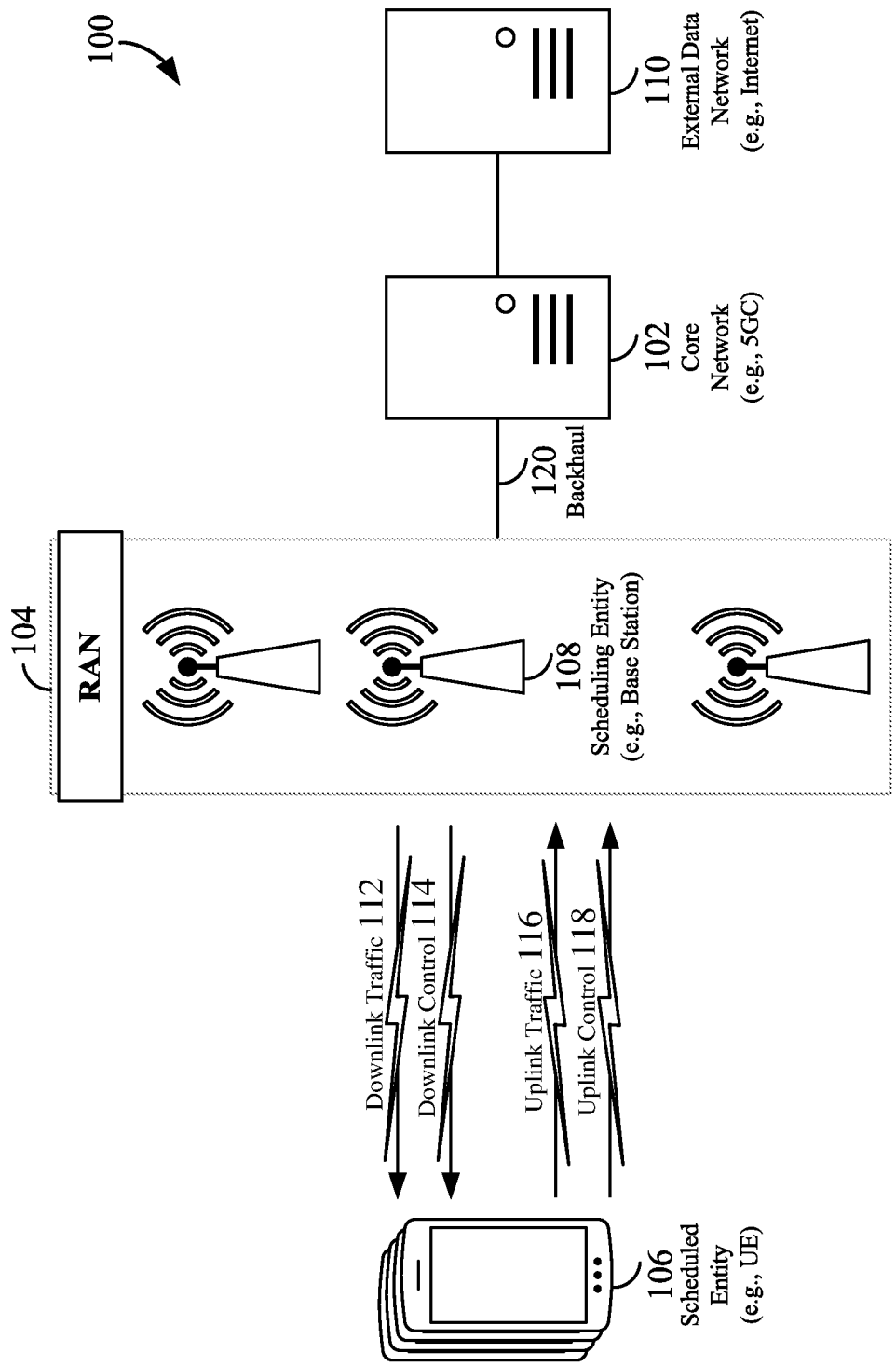
FIG. 1 is a schematic diagram illustrating an example of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
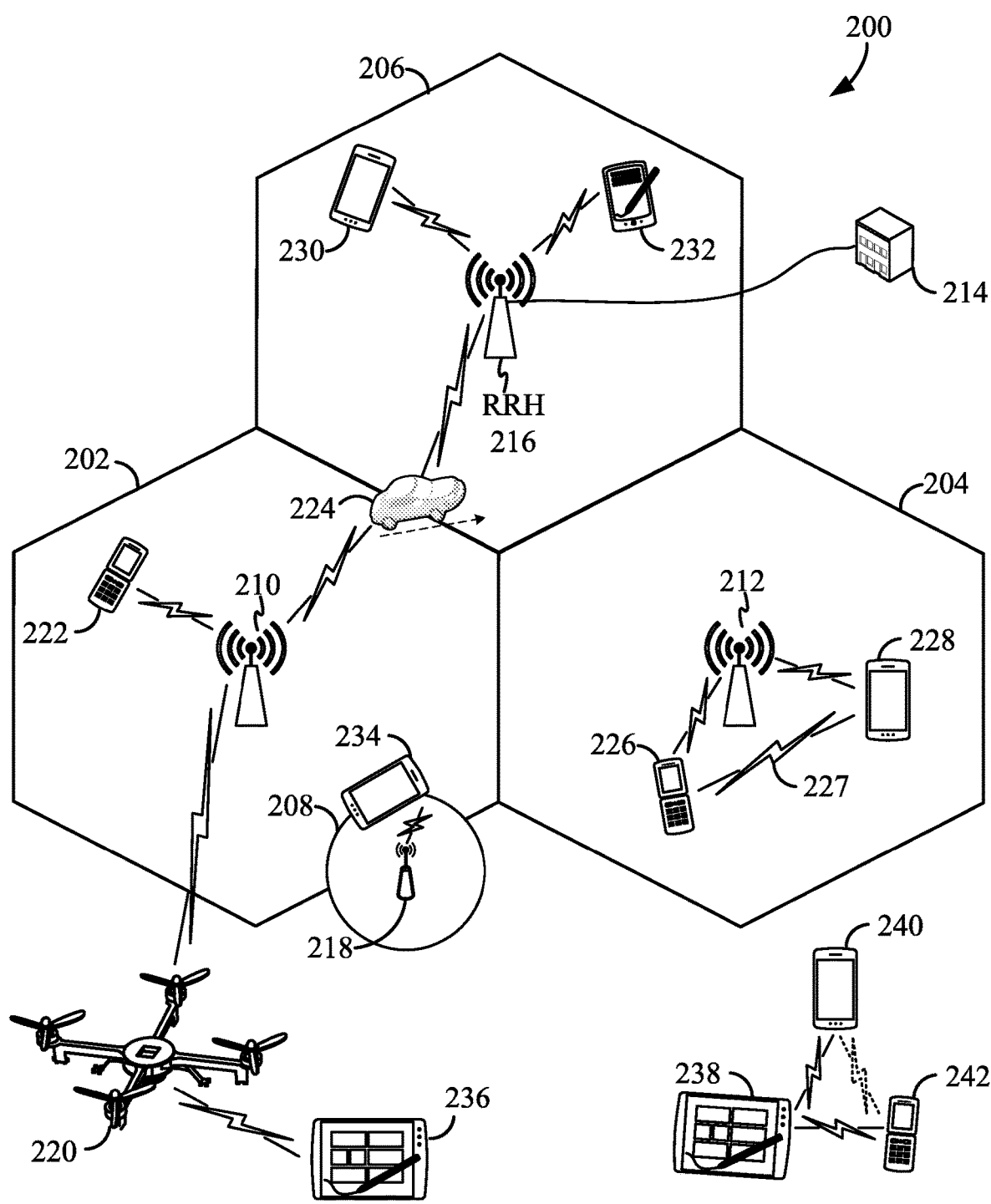
FIG. 2 is a conceptual diagram illustrating an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication. In various aspects of the disclosure, a radio access network 200 may utilize DL-based mobility or UL-based mobility to enable mobility and handovers (i.e., the transfer of a UE's connection from one radio channel to another).

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
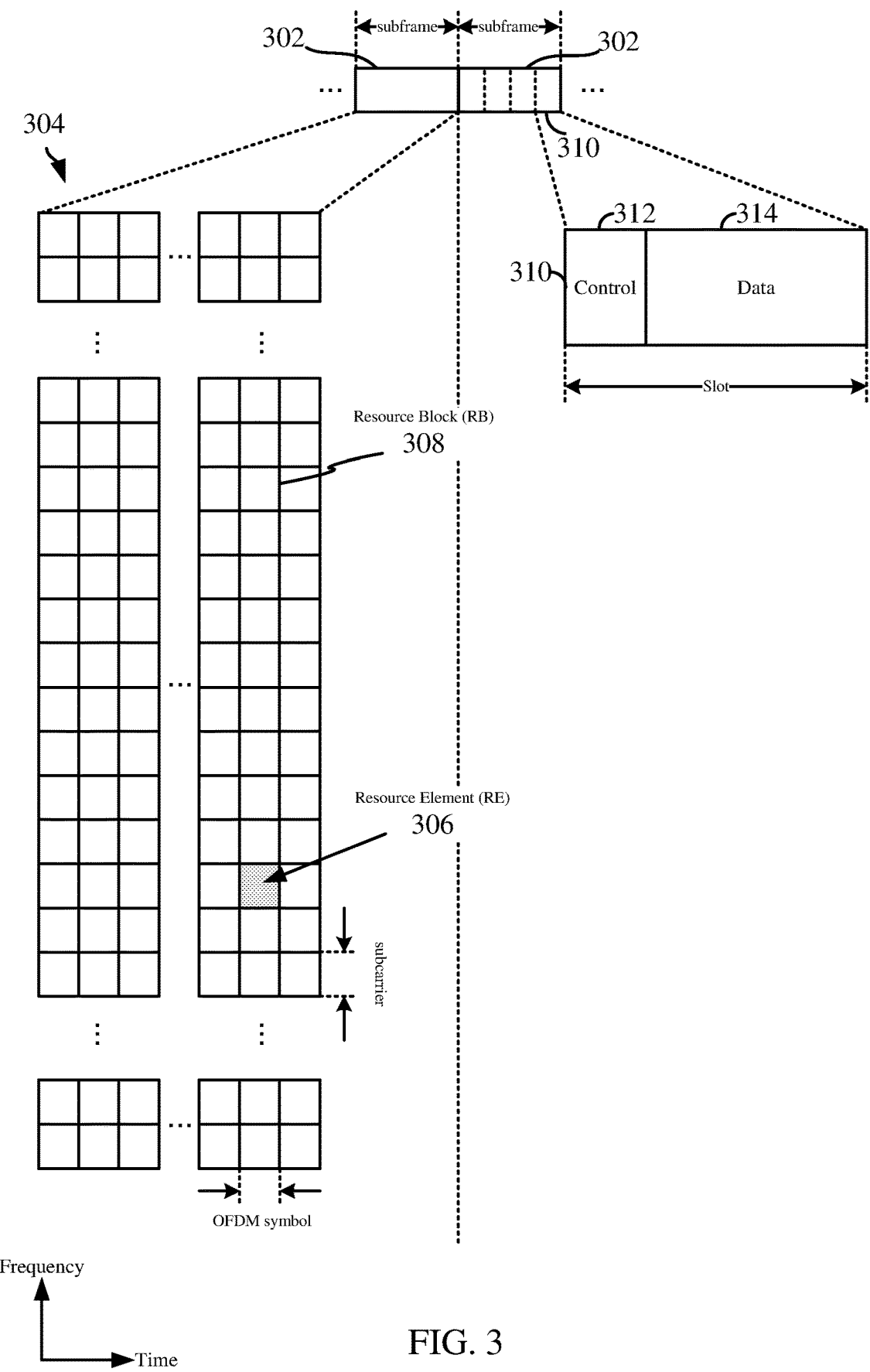
FIG. 3 is a schematic illustration of an organization of wireless resources in an air interface utilizing orthogonal frequency divisional multiplexing (OFDM).

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

As a user equipment (UE) operates in a wireless communication system, a base station may transmit a signal to the UE to indicate whether the UE should decode a subsequent communication (e.g., a downlink channel). This may improve battery efficiency of the UE because the UE may not need to scan for the subsequent communication unless the UE receives the signal. For example, such a signal may be termed a wakeup signal (WUS), where the WUS may be used by a UE before detecting the paging information, which includes the related scheduling information in the control channel (e.g., PDCCH, MPDCCH or NPDCCH), and the paging message in the data channel (e.g., PDSCH, MPDSCH, or NPDSCH). If there is no WUS detected, the UE will go back to sleep and avoid detecting the paging for power saving.

According to one or more aspects of the present disclosure, a WUS sequence may be scrambled so as to avoid false detections, which may be caused by the inter-cell interference among WUS sequences from different cells, and/or the overlapping WUS sequences for different paging of intra-cell UEs in 5G. To this end, it should be noted that reliably detecting a WUS sequence is particularly desirable to make sure the UEs do not create unnecessary delays by missing WUS detection, as well as avoiding unnecessary power waste by falsely detecting the wrong WUS. The cell ID used to differentiate the Narrowband Physical Downlink Control Channel (NPDCCH) in 5G is also conveyed within the WUS. Accordingly, in a particular example, it is contemplated that the WUS scrambling sequence design disclosed herein may be associated with the scrambling of the NPDCCH.

Figure 4:
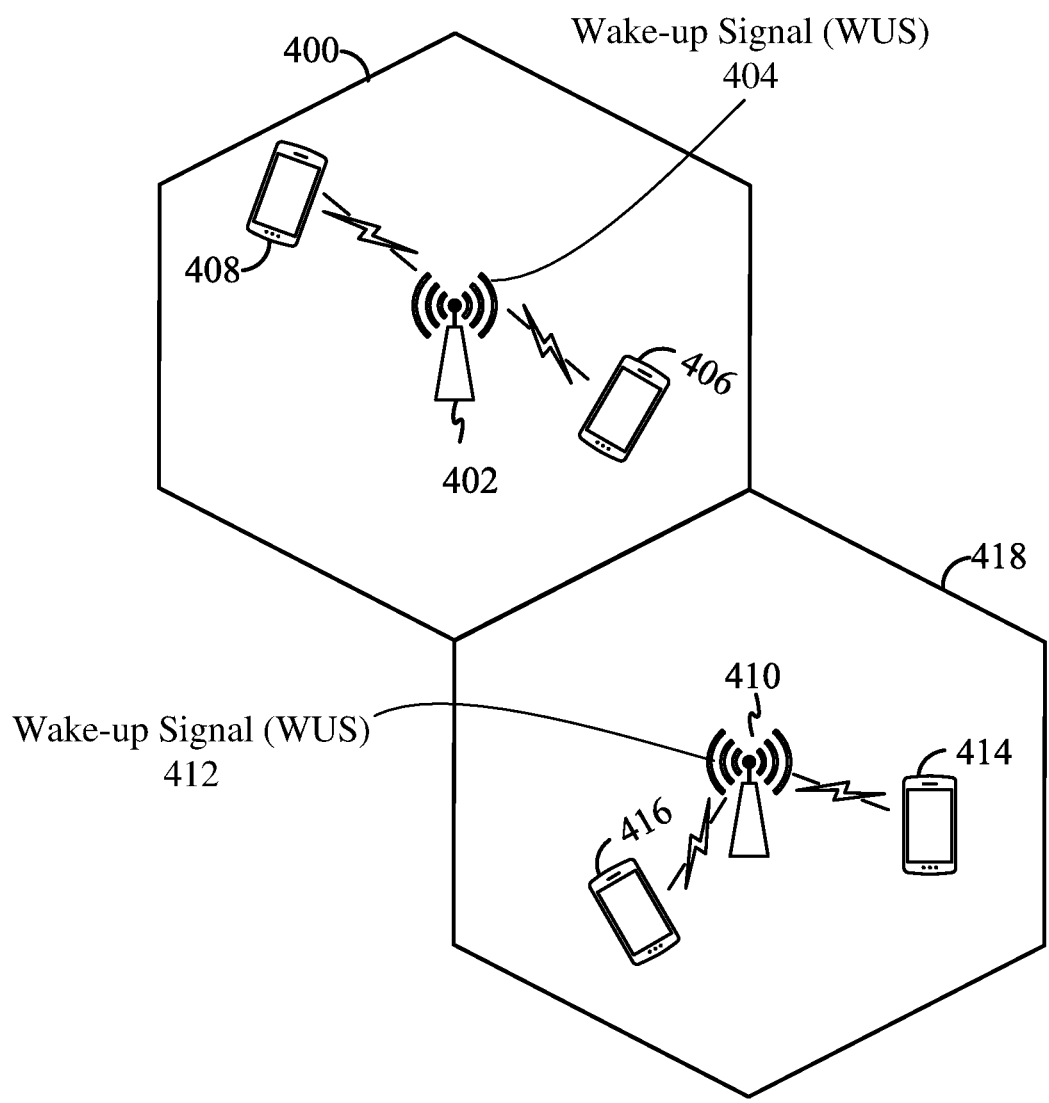
FIG. 4 is an illustration of exemplary base stations transmitting wake-up signals from neighboring cells in accordance with aspects disclosed herein.

For reference, it should be appreciated that the symbol-level phase shift $\theta_{n_f,n_s}$ for NPDCCH (e.g., associated with a Paging-Radio Network Temporary Identifier (P-RNTI)) may be generated based on the scrambling sequence:

$$c_{n_f,n_s}(j), j=0, \ldots 2T-1$$

where T is the number of symbols or REs for NPDCCH in one subframe and each complex-valued symbol $y_{n_f,n_s}(i)$, i=0, ..., T−1 shall be multiplied with $\theta_{n_f,n_s}(i)$, i=0, ..., T−1, defined as $$\theta_{n_f,n_s}(i) = \begin{cases} 1, & \text{if } c_{n_f,n_s}(2i) = 0 \text{ and } c_{n_f,n_s}(2i+1) = 0 \\ -1, & \text{if } c_{n_f,n_s}(2i) = 0 \text{ and } c_{n_f,n_s}(2i+1) = 1 \\ j, & \text{if } c_{n_f,n_s}(2i) = 1 \text{ and } c_{n_f,n_s}(2i+1) = 0 \\ -j, & \text{if } c_{n_f,n_s}(2i) = 1 \text{ and } c_{n_f,n_s}(2i+1) = 1 \end{cases}$$

and where the binary sequence $c_{n_f,n_s}(j)$ may be a Gold sequence (e.g., as given by clause 7.2 of 3GPP TS36.211) initialized at the start of each subframe with:

$$c_{init} = (N_{ID}^{Ncell}+1)((10n_f + \lfloor n_s/2 \rfloor) \bmod 8192+1)2^9$$
$$N_{ID}^{Ncell}$$

where
  $n_f$: system frame number (SFN), radio frame index
  $n_s$: slot index within a radio frame
  $N_{ID}^{Ncell}$: cell ID As previously stated, the ability for a UE to reliably detect a WUS in 5G can be particularly challenging since the WUS base sequence in 5G is mapped within one subframe as a basic unit and repeated/extended for multiple subframes. To better illustrate some of these challenges, FIG. 4 is provided which shows exemplary base stations transmitting wake-up signals from neighboring cells in accordance with aspects disclosed herein. As illustrated, a base station 402 provides a WUS 404 to UEs 406 and 408 within cell 400, whereas base station 410 provides a WUS 412 to UEs 414 and 416 within cell 418. Here, by having the one-subframe base WUS sequence of WUS 404 or 412 repeated over multiple subframes, UEs 406 and 408 may experience inter-cell interference from cell 418 (e.g., due to a bad cell ID pair), whereas UEs 414 and 416 may experience inter-cell interference from cell 400. For some WUS sequences with bad cell ID pairs, the poor cross-correlation results in strong inter-cell interference and such interference is repeated in every repeated subframe, which cannot be reduced by averaging or non-coherent combing of the correlation per subframe at the receiver side.

Figure 5:
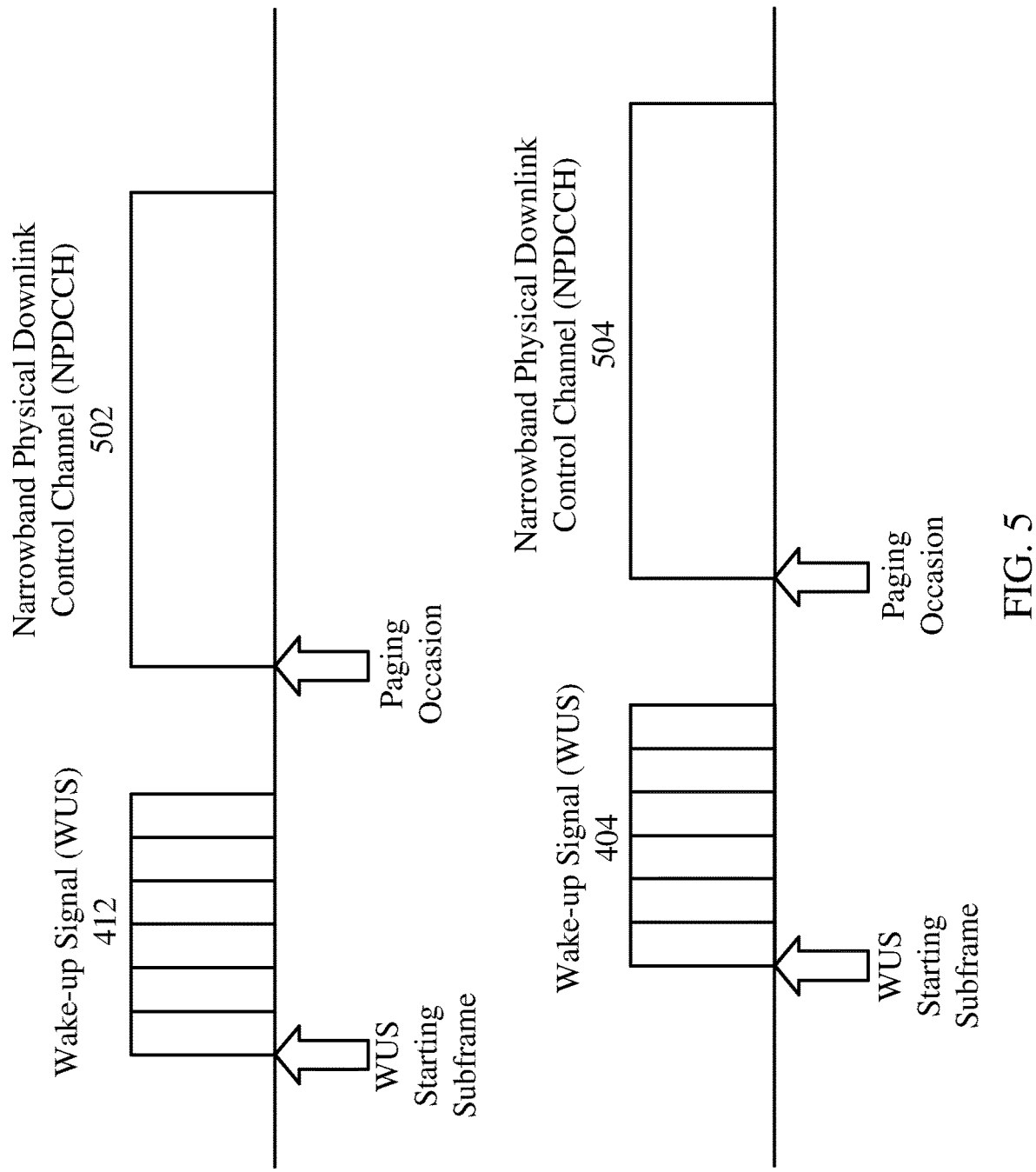
FIG. 5 is a diagram illustrating exemplary overlapping wake-up signals in accordance with aspects disclosed herein.

Having the WUS sequence of WUS 404 or 412 repeated over multiple subframes can also introduce other challenges. To better illustrate some of these additional challenges, FIG. 5 is provided which illustrates how WUS 404 and 412 may undesirably overlap. WUS 404 and 412 could be associated with different Paging Occasions (POs) in the same cell. (Note the PO is the starting valid subframe for the paging, determined by UE IDs as in TS36.304). As illustrated, for this particular example, WUS 412 is associated with NPDCCH 502, whereas WUS 404 is associated with NPDCCH 504. Here, since WUS 404 and 412 overlap, a false WUS detection may occur if the same WUS sequence is detected in the overlapped subframe by different UEs. Moreover, there may be a false WUS detection in which the detected WUS is associated with an incorrect Paging Occasion (PO). For instance, the possible starting subframe offset for paging could be #0, #4, #5, #9 in a radio frame for FDD and #0, #1, #5, #6 in a radio frame for TDD (according to Section 7.2 of TS36.304). Also, if a UE grouping for a WUS is configured for the associated PO, multiple WUS starting subframes for different UE groups associated with the same PO may be used to differentiate the UE-group-specific WUS. Therefore, the starting subframe offset for WUS sequences for different UEs may have a minimum 1 ms distance as the worst case.

Another challenge for WUS detection is the timing drift for a UE to detect a WUS after a long-time sleep. The timing drift may be accumulated as large as one subframe or multiple subframes. The same WUS sequence per subframe will lead to a false detection in the presence of such timing error.

To overcome the aforementioned limitations, a WUS scrambling sequence methodology is proposed in the time-domain and/or frequency-domain. For instance, in a first example, the WUS base sequence may be multiplied by a time-based scrambling sequence (or phase shift) on each WUS RE per subframe, which is generated by using time index parameters associated with the starting subframe of the WUS (or the associated PO), as well as time index parameters of the current WUS subframe and cell ID. In at least one implementation of this first example, the WUS sequence may be $$d(n)=b(n)c(m)e^{-j\pi u n'(n'+1)/131} \quad n=0, \ldots L-1$$

or alternatively $$d(n)=b(n)e^{-j\pi u n'(n'+1)/131} \quad n=0, \ldots L-1$$

where
- L is the RE number of WUS base sequence, e.g., L=11*12 REs in a subframe.
- $e^{-j\pi u n'(n'+1)/131}$ is the ZC sequence with n'=n mod 131 and u=($N_{ID}^{cell}$ mod 126)+3 and where $N_{ID}^{cell}$ is the cell ID in the range of 0, . . . 503.
- c(m) is the cover code for WUS base sequence with n'=n mod 131, m=n mod 127, e.g., 127-Gold sequence to carry $$\left\lfloor \frac{N_{ID}^{Cell}}{126} \right\rfloor$$

and/or $N_{ID}^{GROUP}$
- b(n) is the RE-level cover codes/scrambling sequence defined as $$b(n) = \begin{cases} 1, & \text{if } c_{n_f,n_s}(2i) = 0 \text{ and } c_{n_f,n_s}(2i+1) = 0 \\ -1, & \text{if } c_{n_f,n_s}(2i) = 0 \text{ and } c_{n_f,n_s}(2i+1) = 1 \\ j, & \text{if } c_{n_f,n_s}(2i) = 1 \text{ and } c_{n_f,n_s}(2i+1) = 0 \\ -j, & \text{if } c_{n_f,n_s}(2i) = 1 \text{ and } c_{n_f,n_s}(2i+1) = 1 \end{cases}$$

and where the binary sequence $c_{n_f,n_s}(j)$, j=0, . . . 2L−1 may be a Gold sequence (e.g., as given by clause 7.2 of TS36.211) initialized by $c_{init\_WUS}$.

In a first implementation of this example, it is contemplated that a time-varying RE-level WUS scrambling sequence can be generated by using the Gold sequence with a length of 2 T, and T can be matched with the length of one WUS subframe, e.g., T is the number of REs of one WUS subframe, and initialized at the start of each WUS subframe based on the time index of the starting and current WUS subframe and cell ID. Namely, for this particular implementation, the WUS scrambling sequence may be generated according to:

$$c_{init\_WUS} = (N_{ID}^{Ncell}+1)\left[\left(\left(10n_{f\_start}+\left\lfloor\frac{n_{s\_start}}{2}\right\rfloor\right)\bmod W+1\right)^q 2^X + \left(\left(10n_f+\left\lfloor\frac{n_s}{2}\right\rfloor\right)\bmod W+1\right)^{q'}\right]2^9 + N_{ID}^{Ncell}$$

where $$10n_{f\_start}+\left\lfloor\frac{n_{s\_start}}{2}\right\rfloor$$

is the starting subframe index of WUS or the associated PO
W could be
- WUS max duration configured by higher layer, e.g., W=64.
- Or DRX cycle configured by higher layer, e.g., W=512 when DRX cycle is 512 ms
- Or fixed for sake of simplicity, e.g., W=128 as min DRX cycle (in ms) for NB-IoT, or W=128 as largest value of WUS max duration (in ms), or W=8129, same as that for the scrambling of NPDCCH.

q could be a fixed integer, e.g., q=1, q=2, or q=3.
q' could be a fixed integer, e.g., q'=1, q'=2, or q'=3.
q' could be same as q
$X=\lceil \log 2(W^q) \rceil$ Alternatively, for this particular implementation, the WUS scrambling sequence may be generated according to:

$$c_{init_{WUS}} = (N_{ID}^{Ncell}+1)\left(\left(10n_f+\left\lfloor\frac{n_s}{2}\right\rfloor+10n_{f\_start}+\left\lfloor\frac{n_{s\_start}}{2}\right\rfloor\right)\bmod W+1\right)^q 2^9 + N_{ID}^{Ncell}$$

where $$10n_{f\_start}+\left\lfloor\frac{n_{s\_start}}{2}\right\rfloor$$

is the starting subframe index of WUS or the associated PO
W could be
- WUS max duration configured by higher layer, e.g., W=64.
- Or DRX cycle configured by higher layer, e.g., W=512 when DRX cycle is 512 ms
- Or fixed for sake of simplicity, e.g., W=128 as min DRX cycle (in ms) for NB-IoT, or W=128 as largest value of WUS max duration (in ms), or W=8192, same as that for the scrambling of NPDCCH.

q could be a fixed integer, e.g., q=1, q=2, or q=3.

In a second implementation of this first example, it is contemplated that a time-varying RE-level WUS scrambling sequence can be generated by using the Gold sequence with a length of 2 T, and T can be matched with the length of all WUS subframes, e.g., T is the number of REs of all WUS subframes, and initialized at the start of the first WUS subframe based on the time index of the starting WUS subframe and cell ID. Namely, for this particular implementation, the WUS scrambling sequence may be generated according to:

$$c_{init\_WUS} = (N_{ID}^{Ncell} + 1)\left(\left(10n_{f\_start} + \left\lfloor\frac{n_{s\_start}}{2}\right\rfloor\right)modW + 1\right)^q 2^9 + N_{ID}^{Ncell}$$

where $$10n_{f\_start} + \left\lfloor\frac{n_{s\_start}}{2}\right\rfloor$$

is the starting subframe index of WUS or the associated PO (e.g., $n_{f\_start}$ may be the first frame of the first PO to which the WUS is associated, and $n_{s\_start}$ may be the first slot of the first PO to which the WUS is associated)

W could be
- WUS max duration configured by higher layer, e.g., W=64.
- Or DRX cycle configured by higher layer, e.g., W=512 when DRX cycle is 512 ms
- Or fixed for sake of simplicity, e.g., W=2048, W=128 as min DRX cycle (in ms) for NB-IoT, or W=128 as largest value of WUS max duration (in ms), or W=8192, same as that for the scrambling of NPDCCH.

q could be a fixed integer, e.g., q=1, q=2, or q=3.

It should be noted that if $$10n_{f\_start} + \left\lfloor\frac{n_{s\_start}}{2}\right\rfloor$$

is the starting subframe index of the WUS and the UE-group-specific WUS is configured with a different starting subframe index, the above can also be used to differentiate the WUS for different UE groups.

In a third implementation of this first example, it is contemplated that a time-varying RE-level WUS scrambling sequence can be generated by using the Gold sequence with a length of 2 T, and T can be matched with the length of one WUS subframe, e.g., T is the number of REs of one WUS subframe, and initialized at the start of each WUS subframe based on the time index of the starting and current WUS subframe and cell ID. Namely, for this particular implementation, the WUS scrambling sequence may be generated according to:

$$c_{init} = \left(\left((N_{ID}^{Cell} + 1)2^{log2(N_{group})} + N_{ID}^{Group}\right)\right.$$

$$\left(\left(\left(10n_{f\_start} + \left\lfloor\frac{n_{s\_start}}{2}\right\rfloor\right)modW + 1\right)^q 2^X + \right.$$
$$\left.\left(\left(10n_f + \left\lfloor\frac{n_s}{2}\right\rfloor\right)modW + 1\right)^{q'}\right)$$
$$\left. 2^{9+log2(N_{Group})} + (N_{ID}^{Cell} + 1)2^{log2(N_{Group})} + N_{ID}^{Group}\right.$$

$$10n_{f\_start} + \left\lfloor\frac{n_{s\_start}}{2}\right\rfloor$$

is the starting subframe index of WUS or associated PO $N_{ID}^{cell}$ is the partial cell ID and could be 0, . . . 504.

$N_{ID}^{Group}$ is the UE group ID for WUS in the range of 0, 1, . . . $N_{Group}$−1 with $N_{Group}$ being the number of UE groups, indicated by eNB in SIB.

W could be
- WUS max duration configured by higher layer, e.g., W=64.
- Or DRX cycle configured by higher layer, e.g., W=512 when DRX cycle is 512 ms
- Or fixed for sake of simplicity, e.g., W=128 as min DRX cycle (in ms) for NB-IoT, or W=128 as largest value of WUS max duration (in ms), or W=8129, same as that for the scrambling of NPDCCH.

q could be a fixed integer, e.g., q=1, q=2, or q=3.

q' could be a fixed integer, e.g., q'=1, q'=2, or q'=3.

q' could be same as q $X = \lceil log\ 2(W^{q'}) \rceil$

It should be noted that the UE group ID may be used to differentiate the WUS for different UE groups.

In a second example, the WUS base sequence can be multiplied by a frequency-based scrambling sequence (or phase shift) per resource element (RE), which can be generated by using time index parameters associated with the starting subframe of the WUS (or the associated PO). Besides the time parameter of WUS starting point (or associated PO), the phase shift is symbol-specific, i.e., changing the phase variation per symbol. It can avoid the sidelobe of cross-correlation between different WUS sequences in the presence of timing offset. The frequency-based scrambling sequence has a length of L, which is matched with the length of the WUS base sequence (e.g., the total number of REs of one WUS subframe). Here, the WUS sequence is also multiplied by a time-based scrambling sequence (or phase shift) on each WUS symbol per subframe, which is generated by using time index parameters associated with the current WUS subframe and cell ID.

In at least one implementation of this second example, it is contemplated that the frequency-based WUS scrambling sequence adds a phase shift based on the index of the starting WUS subframe and the symbol index according to:

$$d(n) = b(n)e^{-j2\pi n\theta}c(m)e^{-j\pi un'(n'+1)/131}\ n=0,\ldots L-1$$

or alternatively $$d(n) = b(n)e^{-j2\pi n\theta}e^{-j\pi un'(n'+1)/131}\ n=0,\ldots L-1$$

where

L is the RE number of WUS base sequence, e.g., L=11*12 REs in a subframe.

$e^{-j\pi un'(n'+1)/131}$ is the ZC sequence with n'=n mod 131 and u=($N_{ID}^{cell}$ mod 126)+3 and where $N_{ID}^{cell}$ is the cell ID in the range of 0, . . . 503 c(m) is the cover code for WUS base sequence with n'=n mod 131, m=n mod 127, e.g., 127-Gold sequence to carry $$\left\lfloor\frac{N_{ID}^{Cell}}{126}\right\rfloor$$

and/or $N_{ID}^{Group}$ b(n) is the RE-level cover codes/scrambling sequence defined as $$b(n) = \begin{cases} 1, & \text{if } c_{n_f,n_s}(2i) = 0 \text{ and } c_{n_f,n_s}(2i+1) = 0 \\ -1, & \text{if } c_{n_f,n_s}(2i) = 0 \text{ and } c_{n_f,n_s}(2i+1) = 1 \\ j, & \text{if } c_{n_f,n_s}(2i) = 1 \text{ and } c_{n_f,n_s}(2i+1) = 0 \\ -j, & \text{if } c_{n_f,n_s}(2i) = 1 \text{ and } c_{n_f,n_s}(2i+1) = 1 \end{cases}$$

and where the binary sequence $c_{n_f,n_s}(j)$, $j=0, \ldots 2L-1$ may be a Gold sequence (e.g., as given by clause 7.2 of TS36.211) initialized by $c_{init\_WUS}$.

$\theta_l$ is symbol-specific phase shift depending on the staring subframe of WUS and symbol index, with $$l = \left\lfloor \frac{n}{12} \right\rfloor$$

as symbol index of WUS base sequence

E.g., $\theta_l = \sqrt{l} \left[ \frac{1}{W} \left(10 n_{f_{start}} + \left\lfloor \frac{n_{s_{start}}}{2} \right\rfloor \right) \bmod W' \right]$, where $10 n_{f\_start} + \left\lfloor \frac{n_{s\_start}}{2} \right\rfloor$ is the starting subframe index of WUS or the associated PO
W' could be
  configured max WUS duration, e.g., 64 ms of configured max WUS duration (in ms) and W'=64
  Or DRX cycle configured by higher layer, e.g., W'=512 when DRX cycle is 512 ms
  Or Fixed for sake of simplicity, e.g., W'=128 as min DRX cycle (in ms) for NB-IoT, or W'=128 as largest value of WUS max duration (in ms).

For this particular implementation of the second example, it is further contemplated that the time-varying RE-level WUS scrambling sequence may be similar to that of NPDCCH, which is generated by using the Gold sequence with a length of 2 T, and T is matched with the length of one WUS subframe, e.g., T is the number of REs of one WUS subframe, and initialized at the start of each WUS subframe based on the index of the current WUS subframe and cell ID. For instance, the time-varying RE-level WUS scrambling sequence for this particular implementation may be generated according to:

$$c_{init\_WUS} = (N_{ID}^{Ncell} + 1)\left(\left(10 n_f + \left\lfloor \frac{n_s}{2} \right\rfloor\right) \bmod W + 1\right)^q 2^9 + N_{ID}^{Ncell}$$

where
  W could be
    WUS max duration configured by higher layer, e.g., W=64.
    Or DRX cycle configured by higher layer, e.g., W=512 when DRX cycle is 512 ms
    Or fixed for sake of simplicity, e.g., W=128 as min DRX cycle (in ms) for NB-IoT, or W=128 as largest value of WUS max duration (in ms), or W=8192, same as that for the scrambling of NPDCCH.
  q could be a fixed integer, e.g., q=1, q=2, or q=3.

In a second implementation of the second example, it is contemplated that a time-varying RE-level WUS scrambling sequence can be generated by using the Gold sequence with a length of 2 T, and T can be matched with the length of all WUS subframes, e.g., the total number of REs of all WUS subframes, and initialized at the start of the first WUS subframe based on the time index of the starting WUS subframe and cell ID. Namely, for this particular implementation, the WUS scrambling sequence may be generated according to:

$$c_{init\_WUS} = (N_{ID}^{Ncell} + 1)\left(\left(10 n_{f\_start} + \left\lfloor \frac{n_{s\_start}}{2} \right\rfloor\right) \bmod W + 1\right)^q 2^9 + N_{ID}^{Ncell}$$

where $10 n_{f\_start} + \left\lfloor \frac{n_{s\_start}}{2} \right\rfloor$ is the starting subframe index of WUS or the associated PO
W could be
  WUS max duration configured by higher layer, e.g., W=64.
  Or DRX cycle configured by higher layer, e.g., W=512 when DRX cycle is 512 ms
  Or fixed for sake of simplicity, e.g., W=128 as min DRX cycle (in ms) for NB-IoT, or W=128 as largest value of WUS max duration (in ms), or W=8192, same as that for the scrambling of NPDCCH.
q could be a fixed integer, e.g., q=1, q=2, or q=3.

In a third example, aspects are contemplated for a UE group WUS, where the WUS sequence caries a UE group ID in an initialization seed to facilitate differentiating a UE group WUS. It is contemplated that the WUS sequence may be $$d(n) = b(n) e^{-j\pi u n'(n'+1)/131} \, n=0, \ldots L-1$$

where
  L is the RE number of WUS base sequence, e.g., L=11*12 REs in a subframe.
  $e^{-j\pi u n'(n'+1)/131}$ is the ZC sequence with n'=n mod 131 and u=($N_{ID}^{cell}$ mod 126)+3 and where $N_{ID}^{cell}$ is the cell ID in the range of 0, ... 503.
  b(n) is the RE-level scrambling sequence defined as $$b(n) = \begin{cases} 1, & \text{if } c_{n_f,n_s}(2i) = 0 \text{ and } c_{n_f,n_s}(2i+1) = 0 \\ -1, & \text{if } c_{n_f,n_s}(2i) = 0 \text{ and } c_{n_f,n_s}(2i+1) = 1 \\ j, & \text{if } c_{n_f,n_s}(2i) = 1 \text{ and } c_{n_f,n_s}(2i+1) = 0 \\ -j, & \text{if } c_{n_f,n_s}(2i) = 1 \text{ and } c_{n_f,n_s}(2i+1) = 1 \end{cases}$$

and where the binary sequence $c_{n_f,n_s}(j)$, $j=0, \ldots 2L-1$ may be a Gold sequence (e.g., as given by clause 7.2 of TS36.211) initialized by $c_{init\_WUS}$.

In one or more implementations of this third example, it is assumed that the time-varying RE-level WUS scrambling sequence is generated by using the Gold sequence with a length of 2 T, and T is matched with the length of all WUS subframes (e.g., T may be the number of REs of all WUS subframes, and initialized at the start of the first WUS subframe based on the time index of the starting subframe index of WUS or the associated PO and cell ID). The initialization of the WUS scrambling sequence may be generated according to variants of:

$$c_{init\_WUS} = (N_{ID}^{Ncell} + 1)\left(\left(10 n_{f\_start} + \left\lfloor \frac{n_{s\_start}}{2} \right\rfloor\right) \bmod 2048 + 1\right) 2^9 + N_{ID}^{Ncell}$$

where $10 n_{f\_start} + \left\lfloor \frac{n_{s\_start}}{2} \right\rfloor$ is the starting subframe index of WUS or an associated PO
In a first implementation of this third example, the UE group ID can be placed in the most significant bit (MSB) of $c_{init\_WUS}$. Here, for instance, the WUS scrambling sequence may be generated according to:

$$c_{init\_WUS} = \left(N_{ID}^{UEgroup}\right)2^{29} +$$
$$\left(N_{ID}^{Ncell} + 1\right)\left(\left(10n_{f\_start} + \left\lfloor \frac{n_{s\_start}}{2} \right\rfloor\right) \bmod 2048 + 1\right)2^9 + N_{ID}^{Ncell}$$

where $N_{ID}^{UEgroup}$ is the UE group ID with $N_{ID}^{UEgroup} = \{0, \ldots (N_{UEgroup}-1)\}$; and $N_{UEgroup}$ is the number of UE groups indicated by a higher layer.

When $N_{ID}^{UEgroup}=0$, $c_{init\_WUS}$ is same as the legacy WUS with no UE grouping. If the maximum number of UE groups is no larger than 4, the $c_{init\_WUS}$ of UE group WUS is within the range of 31 bits.

In a second implementation of this third example, the UE group ID is placed in the least significant bit (LSB) of $c_{init\_WUS}$. Here, for instance, the WUS scrambling sequence may be generated according to:

$$c_{init\_WUS} =$$
$$\left(N_{ID}^{Ncell} + 1\right)\left(\left(10n_{f\_start} + \left\lfloor \frac{n_{s\_start}}{2} \right\rfloor\right) \bmod 2048 + 1\right)2^{9+\log_2(N_{UEgroup})} +$$
$$N_{ID}^{Ncell} 2^{\log_2(N_{UEgroup})} + N_{ID}^{UEgroup}$$

where $N_{ID}^{UEgroup}$ is the UE group ID with $N_{ID}^{UEgroup} = \{0, \ldots (N_{UEgroup}-1)\}$; and $N_{UEgroup}$ is the number of UE groups indicated by a higher layer.

When $N_{UEgroup}=1$ and $N_{ID}^{UEgroup}=0$, $c_{init\_WUS}$ is same as the legacy WUS with no UE grouping. If the maximum number of UE groups is no larger than 4, the $c_{init\_WUS}$ of UE group WUS is within the range of 31 bits.

In a third implementation of this third example, the UE group ID is multiplied with the MSB of $c_{init\_WUS}$. Here, for instance, the WUS scrambling sequence may be generated according to:

$$c_{init\_WUS} =$$
$$\left(N_{ID}^{UEgroup} + 1\right)\left(N_{ID}^{Ncell} + 1\right)\left(\left(10n_{f\_start} + \left\lfloor \frac{n_{s\_start}}{2} \right\rfloor\right) \bmod 2048 + 1\right)2^9 + N_{ID}^{Ncell}$$

where $N_{ID}^{UEgroup}$ is the UE group ID with $N_{ID}^{UEgroup} = \{0, \ldots (N_{UEgroup}-1)\}$; and $N_{UEgroup}$ is the number of UE groups indicated by a higher layer.

When $N_{ID}^{UEgroup}=0$, $c_{init\_WUS}$ is same as the legacy WUS with no UE grouping. If the maximum number of UE groups is no larger than 4, the $c_{init\_WUS}$ of UE group WUS is within the range of 31 bits.

In an exemplary implementation for Narrowband Internet of Things (NB-IoT), the base WUS sequence may be one subframe. Here, the base station (e.g., eNB) may configure a different subframe index offset within a radio frame for WUS sequences for different POs or for different UE groups associated with the same PO. The scrambling sequence may be designed to use the time parameter associated with the WUS or PO, which may be at least one or a combination of the subframe, and/or radio frame indices.

Also, for machine-type communication (MTC), it should be noted that the different WUS sequences could be shorter than a subframe. The eNB may configure a different symbol index offset or slot index within a subframe of a radio frame as the starting point for WUS sequences for different POs or for different UE groups associated with the same PO. The scrambling sequence may be designed to use the time parameter associated with the WUS or PO, which may be at least one or a combination of the symbol, slot, subframe, and/or radio frame indices.

Figure 6:
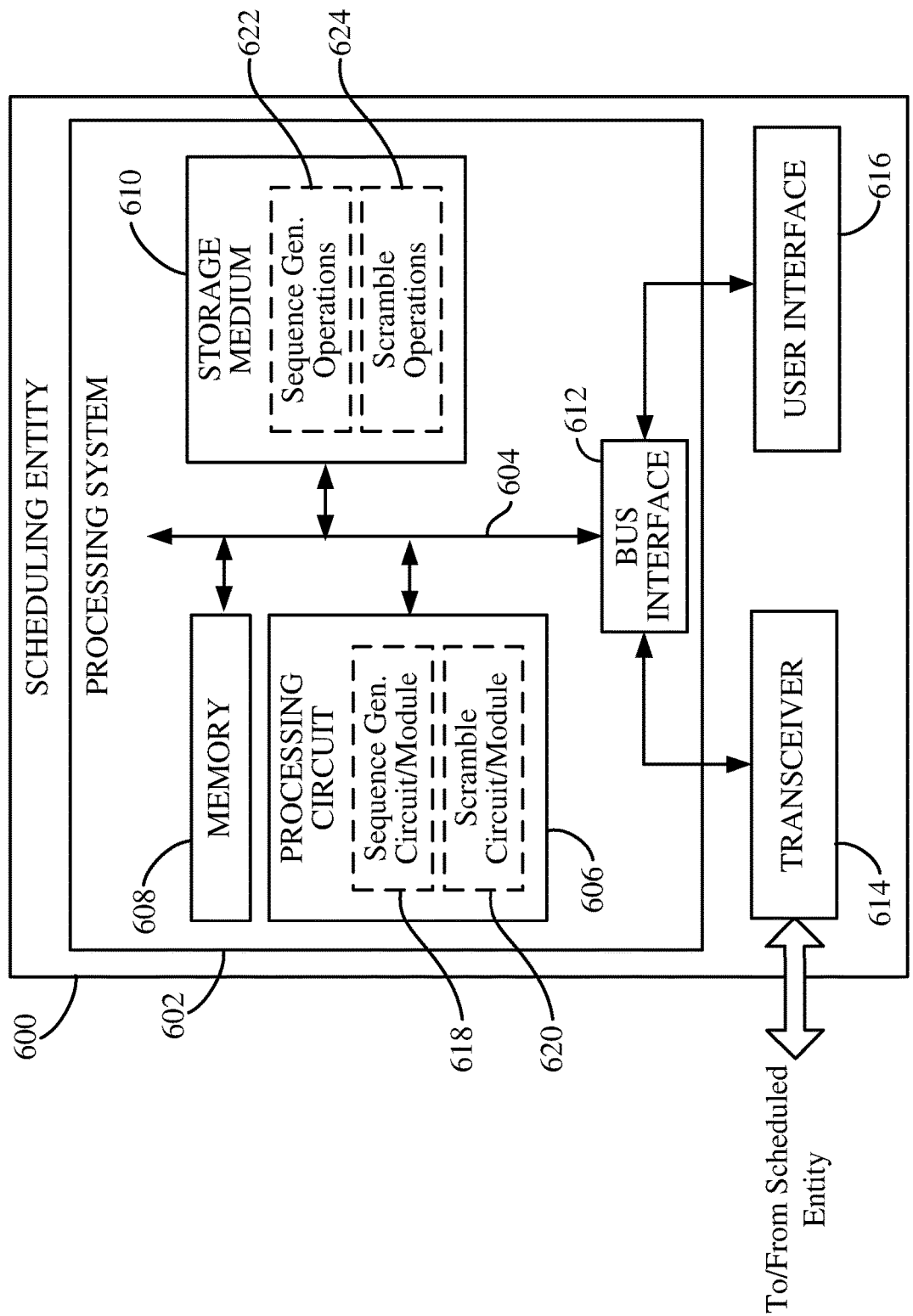
FIG. 6 is a block diagram illustrating select components of a scheduling entity employing a processing system according to at least one example of the present disclosure.

FIG. 6 is a block diagram illustrating select components of a scheduling entity 600 employing a processing system 602 according to at least one example of the present disclosure. In this example, the processing system 602 is implemented with a bus architecture, represented generally by the bus 604. The bus 604 may include any number of interconnecting buses and bridges depending on the specific application of the processing system 602 and the overall design constraints. The bus 604 communicatively couples together various circuits including one or more processors (represented generally by the processing circuit 606), a memory 608, and computer-readable media (represented generally by the storage medium 610). The bus 604 may also link various other circuits such as timing sources, peripherals, voltage regulators, and power management circuits, which are well known in the art, and therefore, will not be described any further. A bus interface 612 provides an interface between the bus 604 and a transceiver 614. The transceiver 614 provides a means for communicating with various other apparatus over a transmission medium. Depending upon the nature of the apparatus, a user interface 616 (e.g., keypad, display, speaker, microphone, joystick) may also be provided.

The processing circuit 606 is responsible for managing the bus 604 and general processing, including the execution of programming stored on the computer-readable storage medium 610. The programming, when executed by the processing circuit 606, causes the processing system 602 to perform the various functions described below for any particular apparatus. The computer-readable storage medium 610 and the memory 608 may also be used for storing data that is manipulated by the processing circuit 606 when executing programming. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 606 is arranged to obtain, process and/or send data, control data access and storage, issue commands, and control other desired operations. The processing circuit 606 may include circuitry adapted to implement desired programming provided by appropriate media, and/or circuitry adapted to perform one or more functions described in this disclosure. For example, the processing circuit 606 may be implemented as one or more processors, one or more controllers, and/or other structure configured to execute executable programming and/or execute specific functions. Examples of the processing circuit 606 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 606 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 606 are for illustration and other suitable configurations within the scope of the present disclosure are also contemplated.

In some instances, the processing circuit 606 may include a sequence generator circuit and/or module 618 and a scramble circuit and/or module 620. The sequence generator circuit and/or module 618 may generally include circuitry and/or programming (e.g., programming stored on the storage medium 610) adapted to generate a time-based scrambling sequence that facilitates a phase shift in time and is generated according to a time parameter (e.g., subframe, frame, slot index, symbol index, etc.) associated with a wake-up signal (WUS) or a paging occasion (PO), as described herein. The scramble circuit/module 620 may generally include circuitry and/or programming (e.g., programming stored on the storage medium 610) adapted to generate a scrambled WUS by multiplying a WUS base sequence by the time-based scrambling sequence, as described herein. As used herein, reference to circuitry and/or programming may be generally referred to as logic (e.g., logic gates and/or data structure logic).

The storage medium 610 may represent one or more computer-readable devices for storing programming, such as processor executable code or instructions (e.g., software, firmware), electronic data, databases, or other digital information. The storage medium 610 may also be used for storing data that is manipulated by the processing circuit 606 when executing programming. The storage medium 610 may be any available non-transitory media that can be accessed by a general purpose or special purpose processor, including portable or fixed storage devices, optical storage devices, and various other mediums capable of storing, containing and/or carrying programming By way of example and not limitation, the storage medium 610 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 610 may be coupled to the processing circuit 606 such that the processing circuit 606 can read information from, and write information to, the storage medium 610. That is, the storage medium 610 can be coupled to the processing circuit 606 so that the storage medium 610 is at least accessible by the processing circuit 606, including examples where the storage medium 610 is integral to the processing circuit 606 and/or examples where the storage medium 610 is separate from the processing circuit 606 (e.g., resident in the processing system 602, external to the processing system 602, distributed across multiple entities).

Programming stored by the storage medium 610, when executed by the processing circuit 606, can cause the processing circuit 606 to perform one or more of the various functions and/or process steps described herein. In at least some examples, the storage medium 610 may include sequence generator operations 622 and/or scramble operations 624. The sequence generator operations 622 are generally adapted to cause the processing circuit 606 to generate a time-based scrambling sequence that facilitates a phase shift in time and is generated according to a time parameter (e.g., subframe, frame, slot index, symbol index, etc.) associated with a wake-up signal (WUS) or a paging occasion (PO), as described herein. The scramble operations 624 are generally adapted to cause the processing circuit 606 to generate a scrambled WUS by multiplying a WUS base sequence by the time-based scrambling sequence, as described herein.

Thus, according to one or more aspects of the present disclosure, the processing circuit 606 is adapted to perform (independently or in conjunction with the storage medium 610) any or all of the processes, functions, steps and/or routines for any or all of the scheduling entities described herein (e.g., base station 104, 210, 212, 214, 218, 402, 410, UE 238, quadcopter 220, scheduling entity 600). As used herein, the term "adapted" in relation to the processing circuit 606 may refer to the processing circuit 606 being one or more of configured, employed, implemented, and/or programmed (in conjunction with the storage medium 610) to perform a particular process, function, step and/or routine according to various features described herein.

Figure 7:
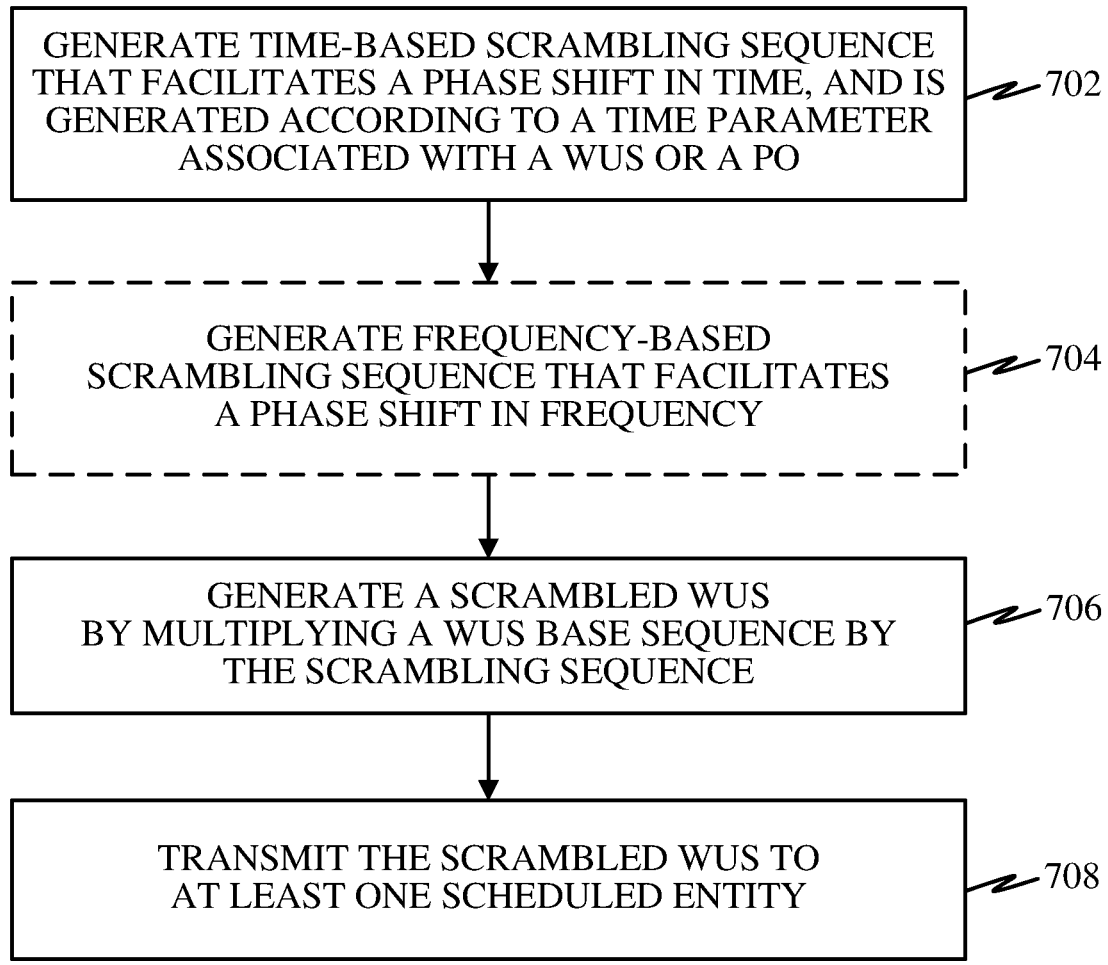
FIG. 7 is a flow diagram illustrating at least one example of a method operational on a scheduling entity.

FIG. 7 is a flow diagram illustrating at least one example of a method operational on a scheduling entity, such as scheduling entity 600. With reference to FIGS. 6 and 7, the scheduling entity 600 may generate a time-based scrambling sequence that facilitates a phase shift in time, and is generated according to a time parameter associated with a WUS or a PO, at operation 702. For example, the scheduling entity 600 may include logic (e.g., sequence generator circuit/module 618, sequence generator operations 622) to generate the time-based scrambling sequence according to a time parameter (e.g., subframe, frame, slot index, symbol index, etc.) associated with a WUS or a PO.

According to various implementations, the time-based scrambling sequence may be generated according to any of a plurality of parameters, such as any of the various implementations for the first example described above. For instance, the time-based scrambling sequence may be generated by matching a length of the time-based scrambling sequence with a length of a total number of symbols in a single WUS subframe, as described previously. Alternatively, the time-based scrambling sequence may be generated by matching a length of the time-based scrambling sequence with a length of a total number of symbols of all WUS subframes, as described previously.

By way of illustration of at least one implementation, and not by way of limitation, the time-based scrambling sequence may be generated according to the second implementation of the first example described above. For example, the scheduling entity 600 may include logic (e.g., sequence generator circuit/module 618, sequence generator operations 622) to generate the time-based scrambling sequence according to the Gold sequence $c_{n_f,n_s}(j)$, j=0, . . . 2L−1 with L as the length of the WUS sequence, initialized at a start of a first WUS subframe based on a first frame $n_{f\_start}$ and first slot $n_{s\_start}$ of the first PO to which the WUS is associated and a cell ID with $$c_{init\_WUS} = (N_{ID}^{Ncell} + 1)\left(\left(10 n_{f\_start} + \left\lfloor \frac{n_{s\_start}}{2} \right\rfloor\right) \bmod W + 1\right)^q 2^9 + N_{ID}^{Ncell}.$$

As noted above, in various implementation W may be fixed (e.g., W=2048) and q may be a fixed integer (e.g., q=1).

At 704, an optional operation is depicted in broken lines, whereby the scheduling entity 600 may also generate a frequency-based scrambling sequence that facilitates a phase shift in frequency. For example, the scheduling entity 600 may include logic (e.g., sequence generator circuit/module 618, sequence generator operations 622) to generate the frequency-based scrambling sequence.

According to various implementations, the frequency-based scrambling sequence may be generated according to any of a plurality of parameters, such as any of the various implementations for the second example described above. In at least one implementation, the frequency-based scrambling sequence may be generated based on a time parameter of a starting point of a WUS transmission or a starting point of a PO transmission. In such an implementation, the time-based scrambling sequence may be generated based on a time parameter of a current WUS transmission. Here, it is noted that the frequency-based scrambling sequence may be generated by matching a length of the frequency-based scrambling sequence with a length of a total number of resource elements of a single WUS subframe. Alternatively, the frequency-based scrambling sequence may be generated by matching a length of the time-based scrambling sequence with a length of a total number of resource elements of either a single WUS subframe or all WUS subframes.

At 706, the scheduling entity 600 generates a scrambled WUS by multiplying a WUS base sequence by the scrambling sequence. For example, the scheduling entity 600 may include logic (e.g., scramble circuit/module 620, scramble operations 624) to scramble the WUS by multiplying the WUS base sequence by the generated scrambling sequence. In the implementations described herein where the scrambling sequence includes only a time-based scrambling sequence, the scrambled WUS may be generated by multiplying the WUS base sequence by the generated time-based scrambling sequence. In the implementations described herein where a frequency-based scrambling sequence is also generated, generation of the scrambled WUS may include multiplying the WUS base sequence by the generated frequency-based scrambling sequence.

Continuing with the specific example noted above at operation 702, the scrambled WUS may be generated according to the second implementation of the first example described above. For example, the scheduling entity 600 may include logic (e.g., scramble circuit/module 620, scramble operations 624) to employ the generated time-based scrambling sequence to generate the scrambled WUS according to $$b(n) = \begin{cases} 1, & \text{if } c_{n_f,n_s}(2i) = 0 \text{ and } c_{n_f,n_s}(2i+1) = 0 \\ -1, & \text{if } c_{n_f,n_s}(2i) = 0 \text{ and } c_{n_f,n_s}(2i+1) = 1 \\ j, & \text{if } c_{n_f,n_s}(2i) = 1 \text{ and } c_{n_f,n_s}(2i+1) = 0 \\ -j, & \text{if } c_{n_f,n_s}(2i) = 1 \text{ and } c_{n_f,n_s}(2i+1) = 1 \end{cases}.$$

In one or more implementations, the scrambled WUS may further be generated based on a UE group identifier, as described above. For instance, in a first exemplary implementation, the scrambled WUS may be generated by placing the UE group identifier in a most significant bit (MSB) of the scrambled WUS. Alternatively, in a second exemplary implementation, the scrambled WUS may be generated by placing the UE group identifier in a least significant bit (LSB) of the scrambled WUS. A third exemplary implementation is also contemplated, wherein the scrambled WUS may be generated by multiplying the UE group identifier with the MSB of the scrambled WUS.

At 708, the scheduling entity 600 transmits the scrambled WUS to at least one scheduled entity. For example, the scheduling entity 600 may include logic (e.g., processing circuit 606) to transmit the scrambled WUS via the transceiver 614 to one or more scheduled entities.

Figure 8:
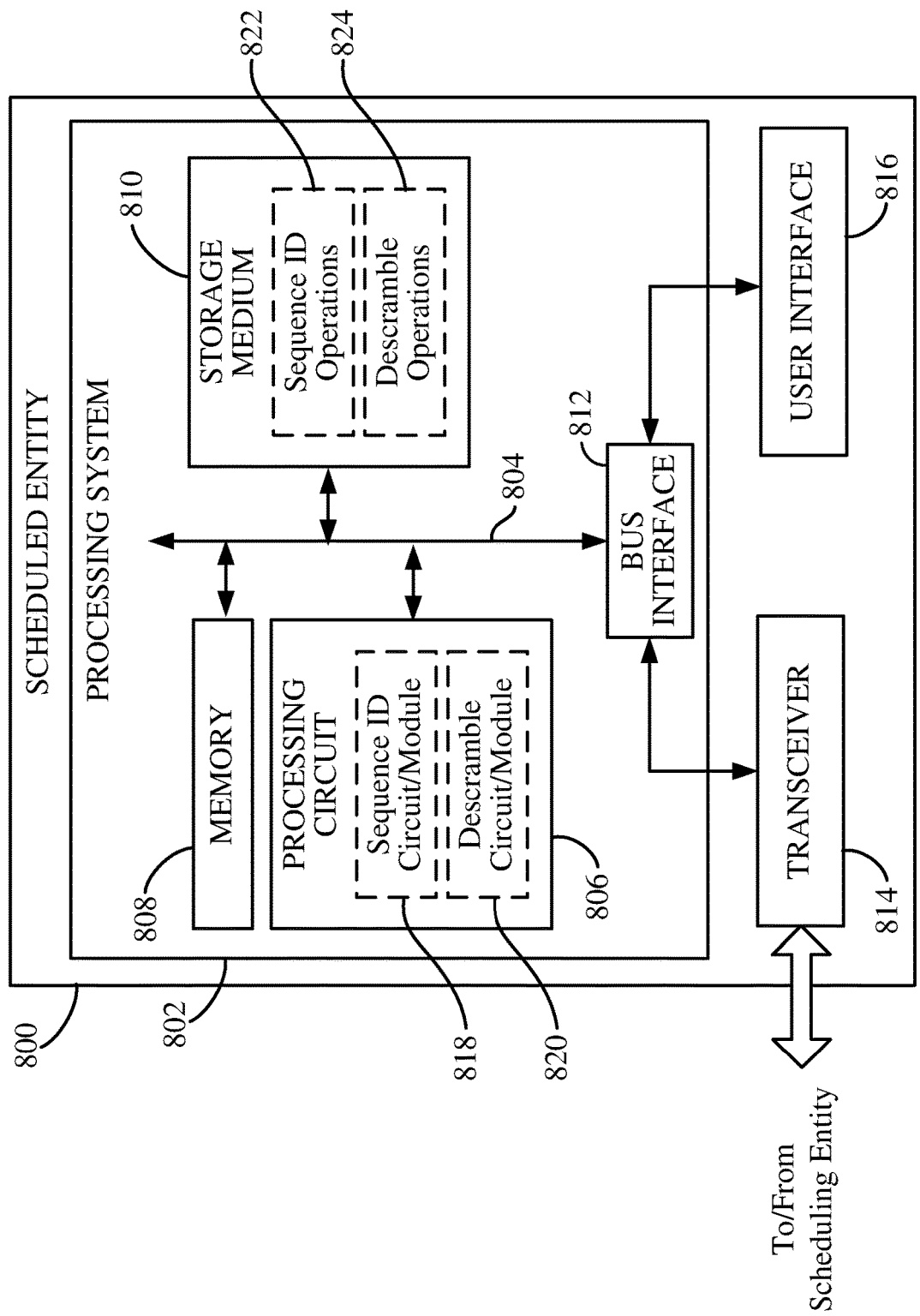
FIG. 8 is a block diagram illustrating select components of a scheduled entity employing a processing system according to at least one example of the present disclosure.

Turning now to FIG. 8, a block diagram is shown illustrating select components of a scheduled entity 800 employing a processing system 802 according to at least one example of the present disclosure. Similar to the processing system 702 in 7, the processing system 802 may be implemented with a bus architecture, represented generally by the bus 804. The bus 804 may include any number of interconnecting buses and bridges depending on the specific application of the processing system 802 and the overall design constraints. The bus 804 communicatively couples together various circuits including one or more processors (represented generally by the processing circuit 806), a memory 808, and computer-readable media (represented generally by the storage medium 810). The bus 804 may also link various other circuits such as timing sources, peripherals, voltage regulators, and power management circuits, which are well known in the art, and therefore, will not be described any further. A bus interface 812 provides an interface between the bus 804 and a transceiver 814. The transceiver 814 provides a means for communicating with various other apparatus over a transmission medium. Depending upon the nature of the apparatus, a user interface 816 (e.g., keypad, display, speaker, microphone, joystick) may also be provided.

The processing circuit 806 is responsible for managing the bus 804 and general processing, including the execution of programming stored on the computer-readable storage medium 810. The programming, when executed by the processing circuit 806, causes the processing system 802 to perform the various functions described below for any particular apparatus. The computer-readable storage medium 810 and the memory 808 may also be used for storing data that is manipulated by the processing circuit 806 when executing programming.

The processing circuit 806 is arranged to obtain, process and/or send data, control data access and storage, issue commands, and control other desired operations. The processing circuit 806 may include circuitry adapted to implement desired programming provided by appropriate media in at least one example, and/or circuitry adapted to perform one or more functions described in this disclosure. The processing circuit 806 may be implemented and/or configured according to any of the examples of the processing circuit 606 described above.

In some instances, the processing circuit 806 may include a sequence identifier circuit and/or module 818 and a descramble circuit and/or module 820. The sequence identifier circuit/module 818 may generally include circuitry and/or programming (e.g., programming stored on the storage medium 810) adapted to identify a time-based scrambling sequence associated with the WUS that facilitates a phase shift in time and corresponds to a time parameter (e.g., subframe, frame, slot index, symbol index, etc.) associated with a WUS or a paging occasion (PO), as described herein. The descramble circuit/module 820 may generally include circuitry and/or programming (e.g., programming stored on the storage medium 810) adapted to descramble the WUS according to the time-based scrambling sequence, as described herein. As noted previously, reference to circuitry and/or programming may be generally referred to as logic (e.g., logic gates and/or data structure logic).

The storage medium 810 may represent one or more computer-readable devices for storing programming, such as processor executable code or instructions (e.g., software, firmware), electronic data, databases, or other digital information. The storage medium 810 may be configured and/or implemented in a manner similar to the storage medium 610 described above.

Programming stored by the storage medium 810, when executed by the processing circuit 806, can cause the processing circuit 806 to perform one or more of the various functions and/or process steps described herein. In at least some examples, the storage medium 810 may include search operations 820 adapted to cause the processing circuit 806 to search for a scaled synchronization channel according to a type of communication, as described herein. Thus, according to one or more aspects of the present disclosure, the processing circuit 806 is adapted to perform (independently or in conjunction with the storage medium 810) any or all of the processes, functions, steps and/or routines for any or all of the scheduled entities described herein (e.g., scheduled entity 106, UE 222, 224, 226, 228, 230, 232, 234, 236, 238, 240, 242, 406, 408, 414, and 416, scheduled entity 800). As used herein, the term "adapted" in relation to the processing circuit 806 may refer to the processing circuit 806 being one or more of configured, employed, implemented, and/or programmed (in conjunction with the storage medium 810) to perform a particular process, function, step and/or routine according to various features described herein.

Figure 9:
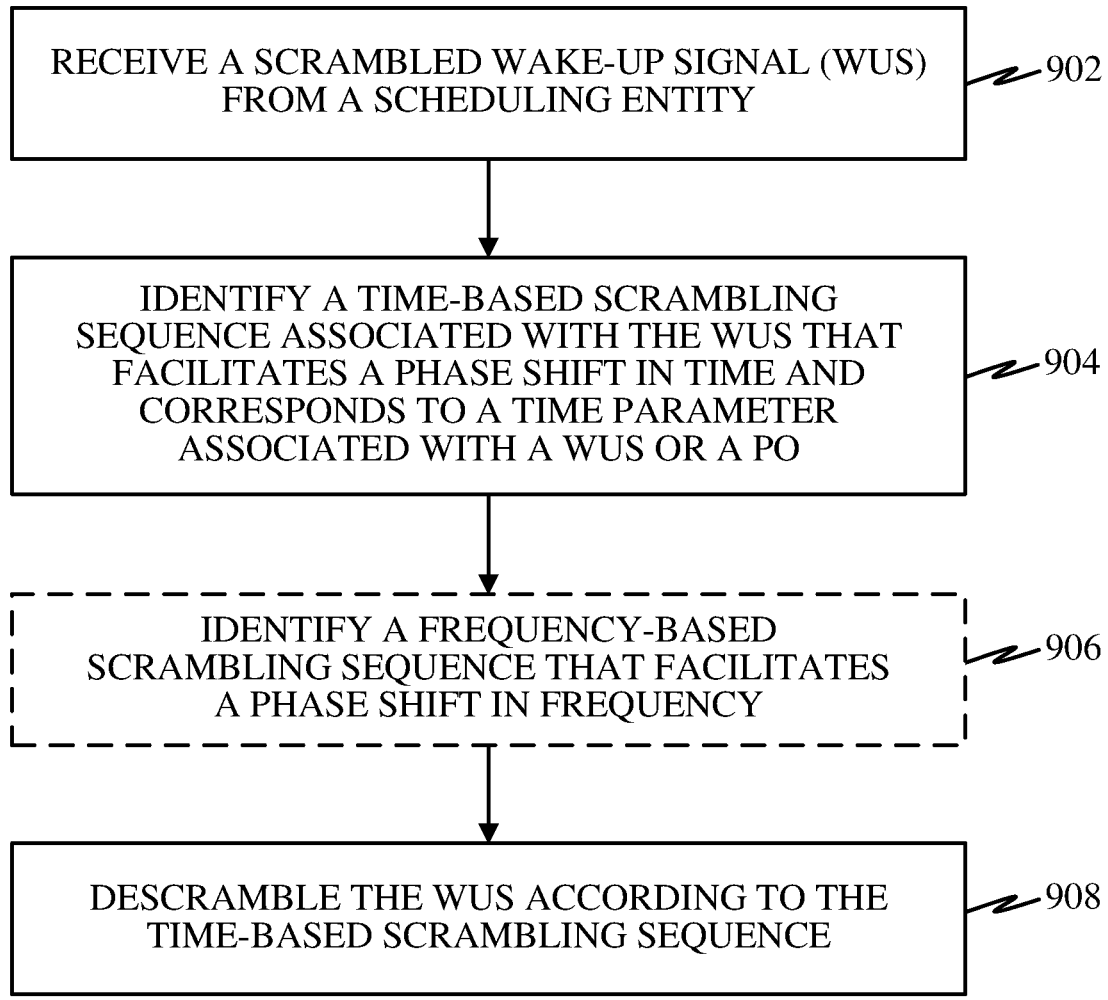
FIG. 9 is a flow diagram illustrating at least one example of a method operational on a scheduled entity.

FIG. 9 is a flow diagram illustrating at least one example of a method operational on a scheduled entity, such as scheduled entity 800. With reference to FIGS. 8 and 9, the scheduled entity 800 may receive a scrambled WUS from a scheduling entity (e.g., scheduling entity 600) at 902. For example, the scheduled entity 800 may include logic (e.g., processing circuit 806) to receive a scrambled WUS via the transceiver from a scheduling entity.

In at least some implementations, the scrambled WUS received by the scheduled entity 800 can be based on a UE group identifier. For instance, in a first exemplary implementation, the scrambled WUS includes the UE group identifier in a most significant bit (MSB) of the scrambled WUS. Alternatively, in a second exemplary implementation, the scrambled WUS includes the UE group identifier in a least significant bit (LSB) of the scrambled WUS. A third exemplary implementation is also contemplated, wherein the scrambled WUS includes a multiplying of the UE group identifier with the MSB of the scrambled WUS.

At 904, the scheduled entity 800 may identify a time-based scrambling sequence associated with the WUS that facilitates a phase shift in time and corresponds to a time parameter associated with a WUS or a PO. For example, the scheduled entity 800 may include logic (e.g., sequence ID circuit/module 818, sequence ID operations 822) to identify a time-based scrambling sequence associated with the WUS that facilitates a phase shift in time and corresponds to a time parameter (e.g., subframe, frame, slot index, symbol index, etc.) associated with a WUS or a PO.

The scheduled entity 800 may include logic (e.g., sequence ID circuit/module 818, sequence ID operations 822) to identify the time-based scrambling sequence according to any of a plurality of parameters. For example, the scheduled entity 800 may include logic (e.g., sequence ID circuit/module 818, sequence ID operations 822) to identify the time-based scrambling sequence by matching a length of the time-based scrambling sequence with a length of a total number of symbols in a single WUS subframe. In another example, the scheduled entity 800 may include logic (e.g., sequence ID circuit/module 818, sequence ID operations 822) to identify the time-based scrambling sequence by matching a length of the time-based scrambling sequence with a length of a total number of symbols of all WUS subframes.

At 906, an optional operation is depicted in broken lines, whereby the scheduled entity 800 may also identify a frequency-based scrambling sequence that facilitates a phase shift in frequency. For example, the scheduled entity 800 may include logic (e.g., sequence ID circuit/module 818, sequence ID operations 822) to identify the frequency-based scrambling sequence.

In at least one example, the scheduled entity 800 may include logic (e.g., sequence ID circuit/module 818, sequence ID operations 822) to identify the frequency-based scrambling sequence based on a time parameter of a starting point of a WUS transmission or a starting point of a PO transmission, and identify the time-based scrambling sequence based on a time parameter of a current WUS transmission. Here, it should be noted that the scheduled entity 800 may include logic (e.g., sequence ID circuit/module 818, sequence ID operations 822) to identify the frequency-based scrambling sequence by matching a length of the frequency-based scrambling sequence with a length of a total number of resource elements of a single WUS subframe. Also, with respect to the time-based scrambling sequence, the scheduled entity 800 may include logic (e.g., sequence ID circuit/module 818, sequence ID operations 822) to identify the time-based scrambling sequence by matching a length of the time-based scrambling sequence with a length of a total number of symbols in a single WUS subframe. Alternatively, the scheduled entity 800 may include logic (e.g., sequence ID circuit/module 818, sequence ID operations 822) to identify the time-based scrambling sequence by matching a length of the time-based scrambling sequence with a length of a total number of symbols of all WUS subframes.

At 908, the scheduled entity 800 descrambles the WUS according to the time-based scrambling sequence. For example, the scheduled entity 800 may include logic (e.g., descramble circuit/module 820, descramble operations 824) to descramble the WUS. In implementations where a frequency-based scrambling sequence is identified, the scheduled entity 800 may include logic (e.g., descramble circuit/module 820, descramble operations 824) to descramble the WUS according to the frequency-based scrambling sequence.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

While the above discussed aspects, arrangements, and embodiments are discussed with specific details and particularity, one or more of the components, steps, features and/or functions illustrated in FIGS. 1, 2, 3, 4, 5, 6, 7, 8, and/or 9 may be rearranged and/or combined into a single component, step, feature or function or embodied in several components, steps, or functions. Additional elements, components, steps, and/or functions may also be added or not utilized without departing from the novel features of the present disclosure. The apparatus, devices and/or components illustrated in FIGS. 1, 2, 4, 6, and/or 8 may be configured to perform or employ one or more of the methods, features, parameters, and/or steps described herein with reference to FIGS. 3, 5, 7, and/or 9. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A wireless communication device, comprising:
   a transceiver;
   a memory; and
   a processor communicatively coupled to the transceiver and the memory, the processor configured to:
   generate a time-based scrambling sequence according to a time parameter associated with one of a wake-up signal (WUS) or a paging occasion (PO), the time-based scrambling sequence facilitating a phase shift in time;
   generate a scrambled WUS, the scrambled WUS generated by multiplying a WUS base sequence by the time-based scrambling sequence; and
   transmit, via the transceiver, the scrambled WUS to at least one scheduled entity.

2. The wireless communication device of claim 1, wherein the time parameter is at least one of a subframe, a frame, a slot index, or a symbol index.

3. The wireless communication device of claim 1, wherein the processor configured to generate the time-based scrambling sequence comprises the processor configured to:
   match a length of the time-based scrambling sequence with a length of a total number of resource elements (REs) in a single WUS subframe.

4. The wireless communication device of claim 1, wherein the processor configured to generate the time-based scrambling sequence comprises the processor configured to:
   match a length of the time-based scrambling sequence with a length of a total number of resource elements (REs) of all WUS subframes.

5. The wireless communication device of claim 4, wherein:
   the processor configured to generate the time-based scrambling sequence comprises the processor configured to generate the time-base scrambling sequence according to a Gold sequence $c_{n_f,n_s}(j), j=0, \ldots 2L-1$ with L as the length of the WUS sequence, initialized at a start of a first WUS subframe based on a first frame $n_{f\_start}$ and first slot $n_{s\_start}$ of the first PO to which the WUS is associated and a cell ID with $$c_{init\_WUS} = (N_{ID}^{Ncell} + 1)\left(\left(10 n_{f\_start} + \left\lfloor \frac{n_{s\_start}}{2} \right\rfloor\right) \mod 2048 + 1\right) 2^9 + N_{ID}^{Ncell};$$

and
   the processor configured to generate the scrambled WUS comprises the processor configured to scramble the WUS according to $$b(n) = \begin{cases} 1, & \text{if } c_{n_f,n_s}(2i) = 0 \text{ and } c_{n_f,n_s}(2i+1) = 0 \\ -1, & \text{if } c_{n_f,n_s}(2i) = 0 \text{ and } c_{n_f,n_s}(2i+1) = 1 \\ j, & \text{if } c_{n_f,n_s}(2i) = 1 \text{ and } c_{n_f,n_s}(2i+1) = 0 \\ -j, & \text{if } c_{n_f,n_s}(2i) = 1 \text{ and } c_{n_f,n_s}(2i+1) = 1 \end{cases}.$$

6. The wireless communication device of claim 1, wherein the processor is further configured to:

generate a frequency-based scrambling sequence, wherein the frequency-based scrambling sequence facilitates a phase shift in frequency; and generate the scrambled WUS by multiplying the WUS base sequence by the time-based scrambling sequence and further by the frequency-based scrambling sequence.

7. The wireless communication device of claim 6, wherein:

the processor configured to generate the frequency-based scrambling sequence comprises the processor configured to generate the frequency-based scrambling sequence based on a time parameter of a starting point of a WUS transmission or a starting point of a PO transmission; and the processor configured to generate the time-based scrambling sequence comprises the processor configured to generate the time-based scrambling sequence based on a time parameter of a current WUS transmission.

8. The wireless communication device of claim 7, wherein the processor configured to generate the frequency-based scrambling sequence comprises the processor configured to:

match a length of the frequency-based scrambling sequence with a length of a total number of resource elements of a single WUS subframe;

match a length of the time-based scrambling sequence with a length of a total number of resource elements (REs) in a single WUS subframe; or match a length of the time-based scrambling sequence with a length of a total number of resource elements (REs) of all WUS subframes.

9. The wireless communication device of claim 1, wherein the processor configured to generate the scrambled WUS comprises the processor configured to:

generate the scrambled WUS based on a UE group identifier.

10. The wireless communication device of claim 9, wherein the processor configured to generate the scrambled WUS further comprises the processor configured to:

place the UE group identifier in a most significant bit (MSB) of the scrambled WUS; or place the UE group identifier in a least significant bit (LSB) of the scrambled WUS; or multiply the UE group identifier with a most significant bit (MSB) of the scrambled WUS.

11. A method of wireless communication, comprising:

generating a time-based scrambling sequence, the time-based scrambling sequence facilitating a phase shift in time and generated according to a time parameter associated with a wake-up signal (WUS) or a paging occasion (PO);

generating a scrambled WUS, the scrambled WUS generated by multiplying a WUS base sequence by the time-based scrambling sequence; and transmitting the scrambled WUS to at least one scheduled entity.

12. The method of claim 11, wherein the time parameter is at least one of a subframe, a frame, a slot index, or a symbol index.

13. The method of claim 11, wherein generating the time-based scrambling sequence comprises one of:

matching a length of the time-based scrambling sequence with a length of a total number of resource elements (REs) in a single WUS subframe; or matching a length of the time-based scrambling sequence with a length of a total number of resource elements (REs) of all WUS subframes.

14. The method of claim 13, wherein:

generating the time-based scrambling sequence comprises generating the time-base scrambling sequence according to a Gold sequence $c_{n_f,n_s}(j), j=0,\ldots 2L-1$ with L as the length of the WUS sequence, initialized at a start of a first WUS subframe based on a first frame $n_{f\_start}$ and first slot $n_{s\_start}$ of the first PO to which the WUS is associated and a cell ID with $$c_{init\_WUS} = (N_{ID}^{Ncell}+1)\left(\left(10n_{f\_start}+\left\lfloor\frac{n_{s\_start}}{2}\right\rfloor\right)\bmod 2048+1\right)2^9 + N_{ID}^{Ncell};$$

and generating the scrambled WUS comprises generating the scrambled WUS according to $$b(n) = \begin{cases} 1, & \text{if } c_{n_f,n_s}(2i)=0 \text{ and } c_{n_f,n_s}(2i+1)=0 \\ -1, & \text{if } c_{n_f,n_s}(2i)=0 \text{ and } c_{n_f,n_s}(2i+1)=1 \\ j, & \text{if } c_{n_f,n_s}(2i)=1 \text{ and } c_{n_f,n_s}(2i+1)=0 \\ -j, & \text{if } c_{n_f,n_s}(2i)=1 \text{ and } c_{n_f,n_s}(2i+1)=1 \end{cases}.$$

15. The method of claim 11, further comprising:

generating a frequency-based scrambling sequence, wherein the frequency-based scrambling sequence facilitates a phase shift in frequency; and wherein generating the scrambled WUS further comprises multiplying the WUS base sequence by the frequency-based scrambling sequence.

16. The method of claim 15, wherein:

generating the frequency-based scrambling sequence comprises generating the frequency-based scrambling sequence based on a time parameter of a starting point of a WUS transmission or a starting point of a PO transmission; and generating the time-based scrambling sequence comprises generating the time-based scrambling sequence based on a time parameter of a current WUS transmission.

17. The method of claim 16, wherein generating frequency-based scrambling sequence comprises one of:

matching a length of the frequency-based scrambling sequence with a length of a total number of resource elements of a single WUS subframe;

matching a length of the time-based scrambling sequence with a length of a total number of resource elements (REs) in a single WUS subframe; or matching a length of the time-based scrambling sequence with a length of a total number of resource elements (REs) of all WUS subframes.

18. The method of claim 11, wherein generating the scrambled WUS further comprises:

generating the scrambled WUS based on a UE group identifier.

19. The method of claim 18, wherein generating the scrambled WUS further comprises one of:

placing the UE group identifier in a most significant bit (MSB) of the scrambled WUS;

placing the UE group identifier in a least significant bit (LSB) of the scrambled WUS; or multiplying the UE group identifier with a most significant bit (MSB) of the scrambled WUS.

20. An apparatus for wireless communication, comprising:
- means for generating a time-based scrambling sequence, the time-based scrambling sequence facilitating a phase shift in time and generated according to a time parameter associated with a wake-up signal (WUS) or a paging occasion (PO);
- means for generating a scrambled WUS, the scrambled WUS generated by multiplying a WUS base sequence by the time-based scrambling sequence; and
- means for transmitting the scrambled WUS to at least one scheduled entity.

21. The apparatus of claim 20, further comprising:
- means for generating a frequency-based scrambling sequence, wherein the frequency-based scrambling sequence facilitates a phase shift in frequency; and
- means for generating the scrambled WUS by multiplying the WUS base sequence by the frequency-based scrambling sequence.

22. The apparatus of claim 21, wherein:
- generating the frequency-based scrambling sequence comprises generating the frequency-based scrambling sequence based on a time parameter of a starting point of a WUS transmission or a starting point of a PO transmission; and
- generating the time-based scrambling sequence comprises generating the time-based scrambling sequence based on a time parameter of a current WUS transmission.

23. The apparatus of claim 20, wherein generating the scrambled WUS further comprises:
- generating the scrambled WUS based on a UE group identifier.

24. The apparatus of claim 20, wherein:
generating the time-based scrambling sequence comprises generating the time-base scrambling sequence according to a Gold sequence $c_{n_f,n_s}(j), j=0, \ldots 2L-1$ with L as the length of the WUS sequence, initialized at a start of a first WUS subframe based on a first frame $n_{f\_start}$ and first slot $n_{s\_start}$ of the first PO to which the WUS is associated and a cell ID with $$c_{init\_WUS} = (N_{ID}^{Ncell} + 1)\left(\left(10 n_{f\_start} + \left\lfloor \frac{n_{s\_start}}{2} \right\rfloor\right) \mod 2048 + 1\right)2^9 + N_{ID}^{Ncell};$$

and
generating the scrambled WUS comprises generating the scrambled WUS according to $$b(n) = \begin{cases} 1, & \text{if } c_{n_f,n_s}(2i) = 0 \text{ and } c_{n_f,n_s}(2i+1) = 0 \\ -1, & \text{if } c_{n_f,n_s}(2i) = 0 \text{ and } c_{n_f,n_s}(2i+1) = 1 \\ j, & \text{if } c_{n_f,n_s}(2i) = 1 \text{ and } c_{n_f,n_s}(2i+1) = 0 \\ -j, & \text{if } c_{n_f,n_s}(2i) = 1 \text{ and } c_{n_f,n_s}(2i+1) = 1 \end{cases}.$$

25. A non-transitory processor-readable storage medium storing processor-executable programming for causing a processing circuit to:
- generate a time-based scrambling sequence, the time-based scrambling sequence facilitating a phase shift in time and generated according to a time parameter associated with a wake-up signal (WUS) or a paging occasion (PO);
- generate a scrambled WUS, the scrambled WUS generated by multiplying a WUS base sequence by the time-based scrambling sequence; and
- transmit the scrambled WUS to at least one scheduled entity.

26. The processor-readable storage medium of claim 25, further comprising processor-executable programming for causing a processing circuit to:
- generate a frequency-based scrambling sequence, wherein the frequency-based scrambling sequence facilitates a phase shift in frequency; and
- generate the scrambled WUS by multiplying the WUS base sequence by the frequency-based scrambling sequence.

27. The processor-readable storage medium of claim 26, wherein:
- the processor-executable programming for causing a processing circuit to generate the frequency-based scrambling sequence comprises the processor-executable programming for causing a processing circuit to generate the frequency-based scrambling sequence based on a time parameter of a starting point of a WUS transmission or a starting point of a PO transmission; and
- the processor-executable programming for causing a processing circuit to generate the time-based scrambling sequence comprises the processor-executable programming for causing a processing circuit to generate the time-based scrambling sequence based on a time parameter of a current WUS transmission.

28. The processor-readable storage medium of claim 25, wherein the processor-executable programming for causing a processing circuit to generate the scrambled WUS comprises processor-executable programming for causing a processing circuit to:
- generate the scrambled WUS based on a UE group identifier.

29. The processor-readable storage medium of claim 25, wherein:
the processor-executable programming for causing a processing circuit to generate the time-based scrambling sequence comprises processor-executable programming for causing a processing circuit to generate the time-base scrambling sequence according to a Gold sequence $c_{n_f,n_s}(j), j=0, \ldots 2L-1$ with L as the length of the WUS sequence, initialized at a start of a first WUS subframe based on a first frame $n_{f\_start}$ and first slot $n_{s\_start}$ of the first PO to which the WUS is associated and a cell ID with $$c_{init\_WUS} = (N_{ID}^{Ncell} + 1)\left(\left(10 n_{f\_start} + \left\lfloor \frac{n_{s\_start}}{2} \right\rfloor\right) \mod 2048 + 1\right)2^9 + N_{ID}^{Ncell};$$

and
the processor-executable programming for causing a processing circuit to generate the scrambled WUS comprises processor-executable programming for causing a processing circuit to scramble the WUS according to $$b(n) = \begin{cases} 1, & \text{if } c_{n_f,n_s}(2i) = 0 \text{ and } c_{n_f,n_s}(2i+1) = 0 \\ -1, & \text{if } c_{n_f,n_s}(2i) = 0 \text{ and } c_{n_f,n_s}(2i+1) = 1 \\ j, & \text{if } c_{n_f,n_s}(2i) = 1 \text{ and } c_{n_f,n_s}(2i+1) = 0 \\ -j, & \text{if } c_{n_f,n_s}(2i) = 1 \text{ and } c_{n_f,n_s}(2i+1) = 1 \end{cases}.$$

30. A wireless communication device, comprising:
a transceiver;
a memory; and
a processor communicatively coupled to the transceiver and the memory, the processor configured to:
receive a scrambled wake-up signal (WUS) from a scheduling entity;
identify a time-based scrambling sequence associated with the WUS, the time-based scrambling sequence facilitating a phase shift in time and corresponding to a time parameter associated with a WUS or a paging occasion (PO); and
descramble the WUS according to the time-based scrambling sequence.

31. The wireless communication device of claim 30, wherein the time parameter is at least one of a subframe, a frame, a slot index, or a symbol index.

32. The wireless communication device of claim 30, wherein the processor configured to identify the time-based scrambling sequence comprises the processor configured to:
match a length of the time-based scrambling sequence with a length of a total number of resource elements (REs) in a single WUS subframe; or
match a length of the time-based scrambling sequence with a length of a total number of resource elements (REs) of all WUS subframes.

33. The wireless communication device of claim 30, the processor further configured to:
identify a frequency-based scrambling sequence, wherein the frequency-based scrambling sequence facilitates a phase shift in frequency; and
descramble the WUS according to the frequency-based scrambling sequence.

34. The wireless communication device of claim 33, wherein:
the processor configured to identify the frequency-based scrambling sequence comprises the processor configured to identify the frequency-based scrambling sequence based on a time parameter of a starting point of a WUS transmission or a starting point of a PO transmission; and
the processor configured to identify the time-based scrambling sequence comprises the processor configured to identify the time-based scrambling sequence based on a time parameter of a current WUS transmission.

35. The wireless communication device of claim 34, wherein the processor configured to identify the frequency-based scrambling sequence comprises the processor configured to:
match a length of the frequency-based scrambling sequence with a length of a total number of resource elements of a single WUS subframe; or
match a length of the time-based scrambling sequence with a length of a total number of resource elements (REs) in a single WUS subframe; or
match a length of the time-based scrambling sequence with a length of a total number of resource elements (REs) of all WUS subframes.

36. The wireless communication device of claim 30, wherein the scrambled WUS is based on a UE group identifier.

37. The wireless communication device of claim 36, wherein the scrambled WUS includes one of
the UE group identifier in a most significant bit (MSB) of the scrambled WUS,
the UE group identifier in a least significant bit (LSB) of the scrambled WUS, or
a multiplying of the UE group identifier with a most significant bit (MSB) of the scrambled WUS.

38. A method of wireless communication, comprising:
receiving a scrambled wake-up signal (WUS) from a scheduling entity;
identifying a time-based scrambling sequence associated with the WUS, the time-based scrambling sequence facilitating a phase shift in time and corresponding to a time parameter associated with a WUS or a paging occasion (PO); and
descrambling the WUS according to the time-based scrambling sequence.

39. The method of claim 38, wherein the time parameter is at least one of a subframe, a frame, a slot index, or a symbol index.

40. The method of claim 38, wherein identifying the time-based scrambling sequence comprises one of:
matching a length of the time-based scrambling sequence with a length of a total number of resource elements (REs) in a single WUS subframe; or
matching a length of the time-based scrambling sequence with a length of a total number of resource elements (REs) of all WUS subframes.

41. The method of claim 38, further comprising:
identifying a frequency-based scrambling sequence, wherein the frequency-based scrambling sequence facilitates a phase shift in frequency; and
descrambling the WUS according to the frequency-based scrambling sequence.

42. The method of claim 41, wherein:
identifying the frequency-based scrambling sequence comprises identifying the frequency-based scrambling sequence based on a time parameter of a starting point of a WUS transmission or a starting point of a PO transmission; and
identifying the time-based scrambling sequence comprises identifying the time-based scrambling sequence based on a time parameter of a current WUS transmission.

43. The method of claim 42, wherein identifying the frequency-based scrambling sequence comprises one of:
matching a length of the frequency-based scrambling sequence with a length of a total number of resource elements of a single WUS subframe;
matching a length of the time-based scrambling sequence with a length of a total number of resource elements (REs) in a single WUS subframe; or
matching a length of the time-based scrambling sequence with a length of a total number of resource elements (REs) of all WUS subframes.

44. The method of claim 38, wherein the scrambled WUS is based on a UE group identifier.

45. The method of claim 44, wherein the scrambled WUS includes one of
the UE group identifier in a most significant bit (MSB) of the scrambled WUS,
the UE group identifier in a least significant bit (LSB) of the scrambled WUS, or
a multiplying of the UE group identifier with a most significant bit (MSB) of the scrambled WUS.

46. An apparatus for wireless communication, comprising:
means for receiving a scrambled wake-up signal (WUS) from a scheduling entity;
means for identifying a time-based scrambling sequence associated with the WUS, the time-based scrambling sequence facilitating a phase shift in time and corresponding to a time parameter associated with a WUS or a paging occasion (PO); and means for descrambling the WUS according to the time-based scrambling sequence.

47. The apparatus of claim 46, further comprising:

means for identifying a frequency-based scrambling sequence, wherein the frequency-based scrambling sequence facilitates a phase shift in frequency; and means for descrambling the WUS according to the frequency-based scrambling sequence.

48. The apparatus of claim 46, wherein the scrambled WUS is based on a UE group identifier.

49. A non-transitory processor-readable storage medium storing processor-executable programming for causing a processing circuit to:

receive a scrambled wake-up signal (WUS) from a scheduling entity;

identify a time-based scrambling sequence associated with the WUS, the time-based scrambling sequence facilitating a phase shift in time and corresponding to a time parameter associated with a WUS or a paging occasion (PO); and descramble the WUS according to the time-based scrambling sequence.

50. The processor-readable storage medium of claim 49, further comprising processor-executable programming for causing a processing circuit to:

identify a frequency-based scrambling sequence, wherein the frequency-based scrambling sequence facilitates a phase shift in frequency; and descramble the WUS according to the frequency-based scrambling sequence.

51. The processor-readable storage medium of claim 49, wherein the scrambled WUS is based on a UE group identifier.

* * * * *